No. 624,091. Patented May 2, 1899.
G. REIN.
FARE REGISTER.
(Application filed Feb. 28, 1898.)
(No Model.) 8 Sheets—Sheet 1.
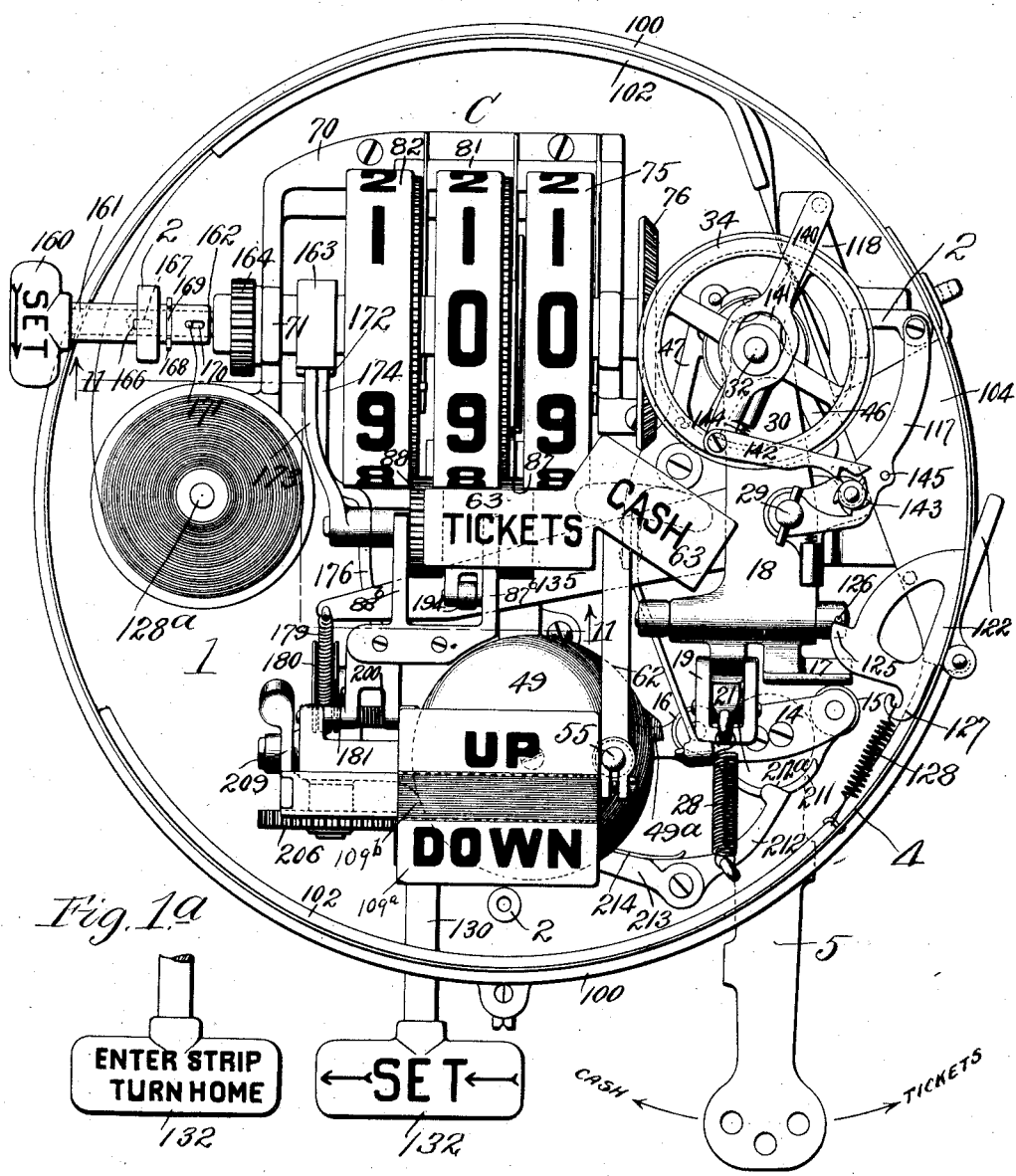

No. 624,091. Patented May 2, 1899.
G. REIN.
FARE REGISTER.
(Application filed Feb. 28, 1898.)
(No Model.) 8 Sheets—Sheet 2.
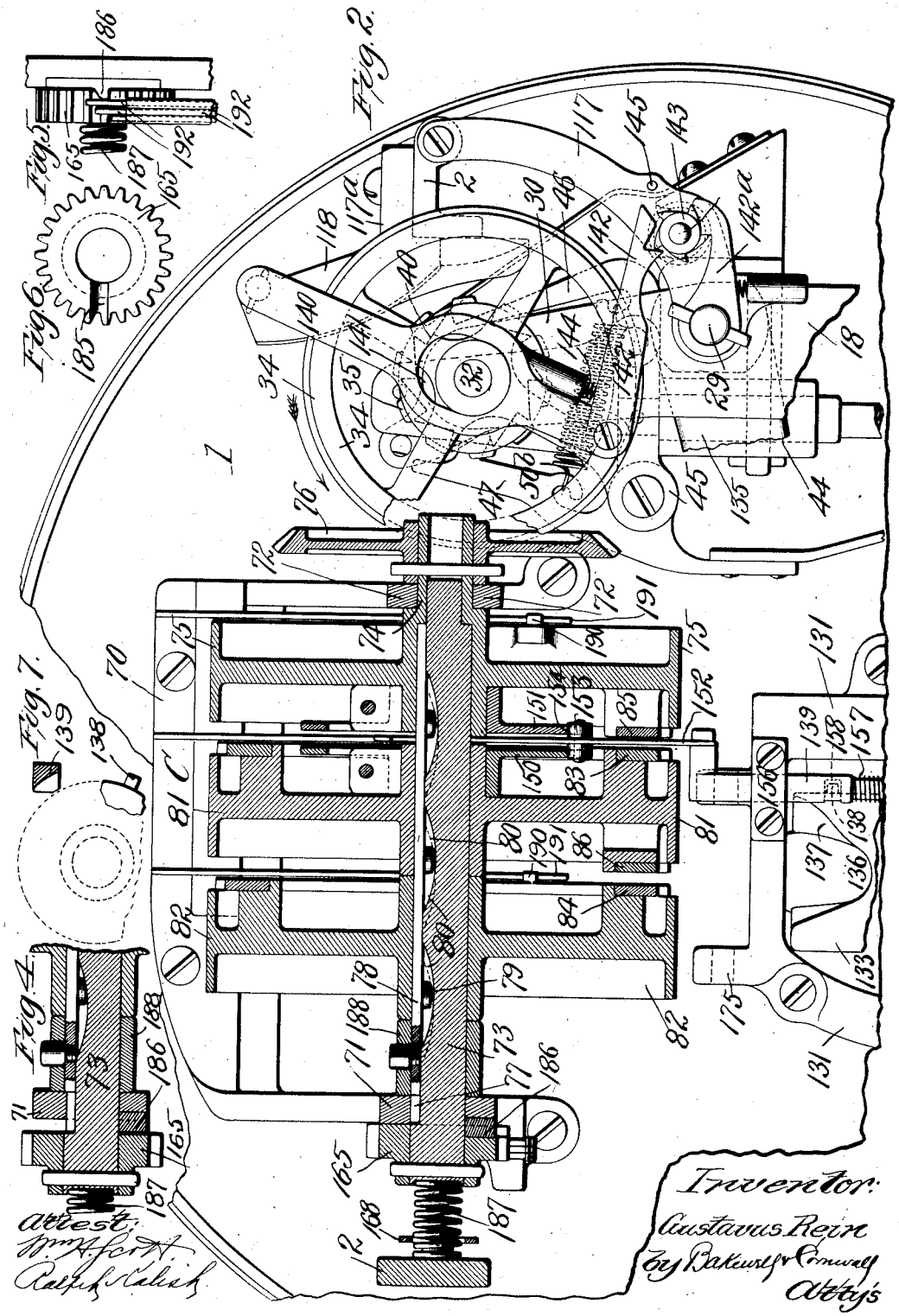

No. 624,091. Patented May 2, 1899.
G. REIN.
FARE REGISTER.
(Application filed Feb. 28, 1898.)
(No Model.) 8 Sheets—Sheet 3.
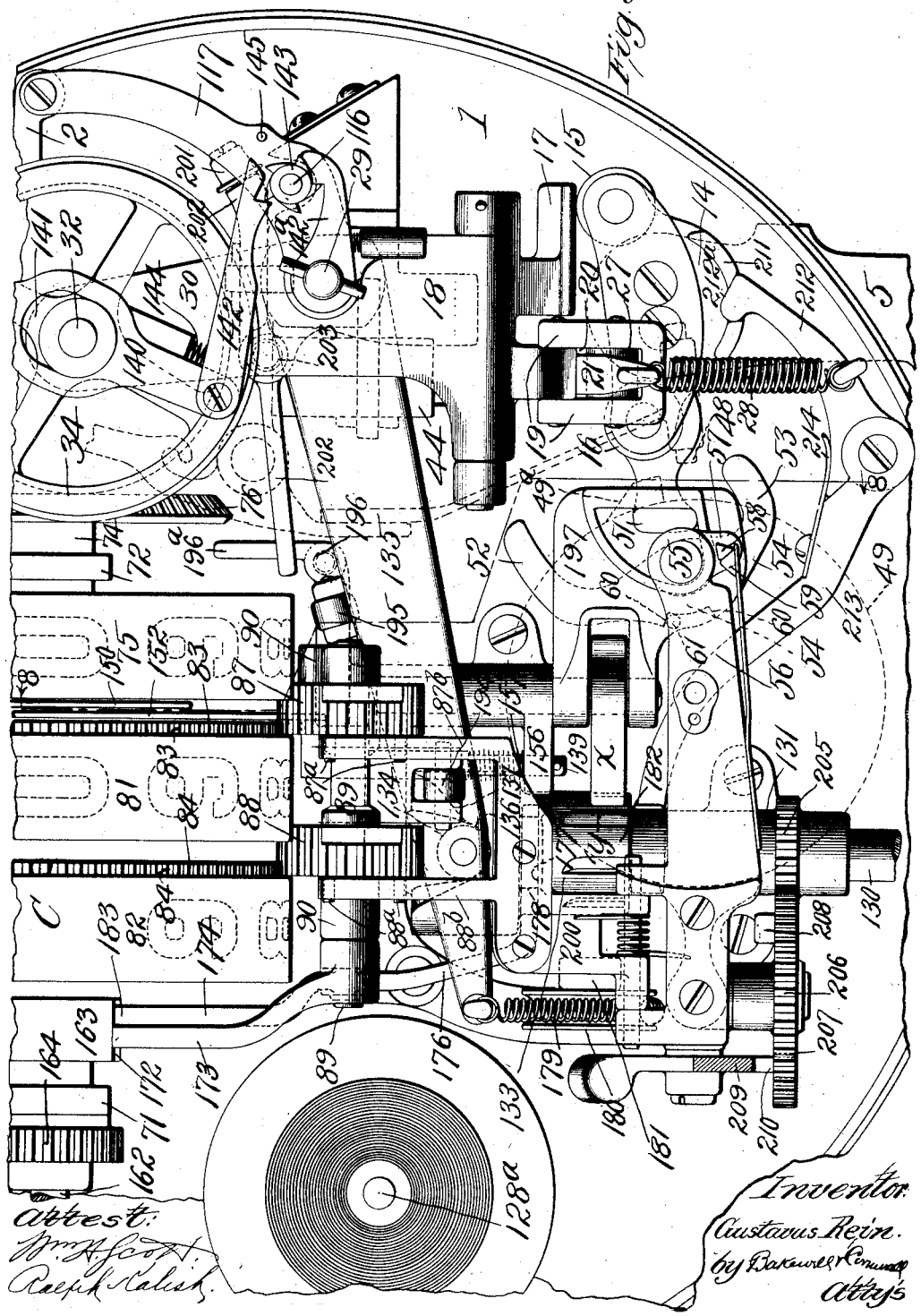

No. 624,091. Patented May 2, 1899.
G. REIN.
FARE REGISTER.
(Application filed Feb. 28, 1898.)
(No Model.) 8 Sheets—Sheet 4.
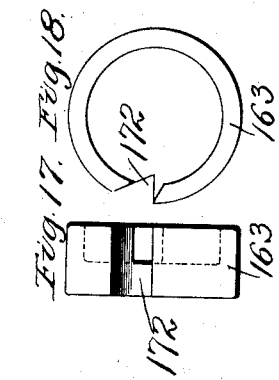
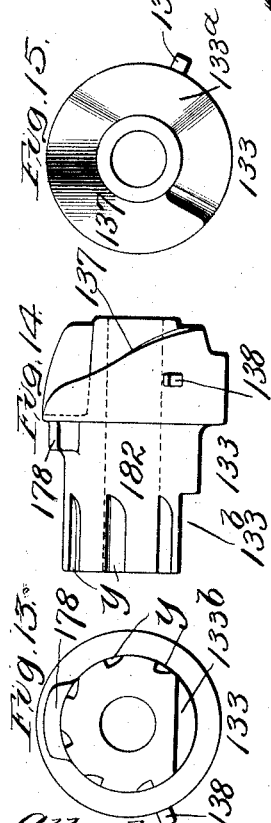
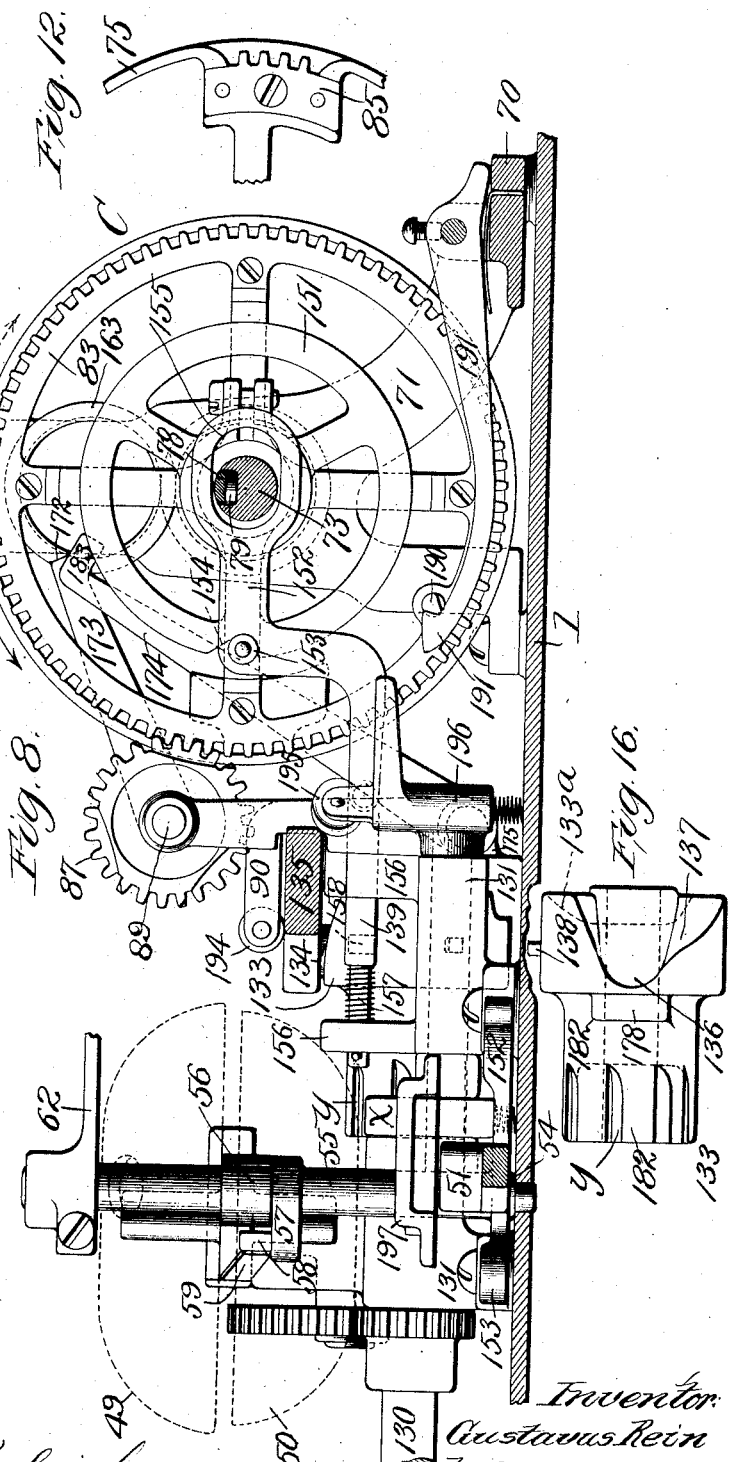

No. 624,091. Patented May 2, 1899.
G. REIN.
FARE REGISTER.
(Application filed Feb. 28, 1898.)
(No Model.) 8 Sheets—Sheet 5.
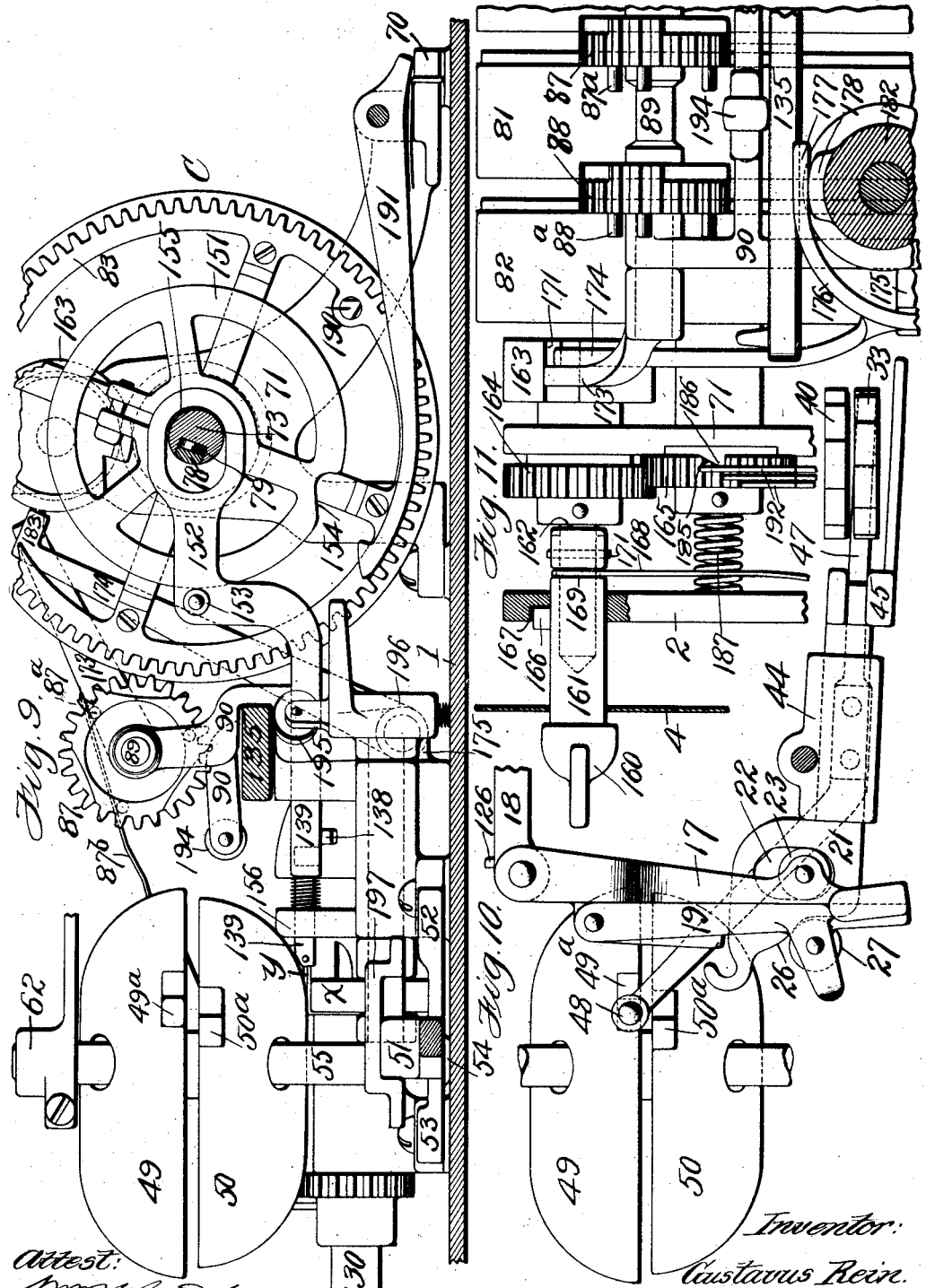

No. 624,091. Patented May 2, 1899.
G. REIN.
FARE REGISTER.
(Application filed Feb. 28, 1898.)
(No Model.) 8 Sheets—Sheet 6.
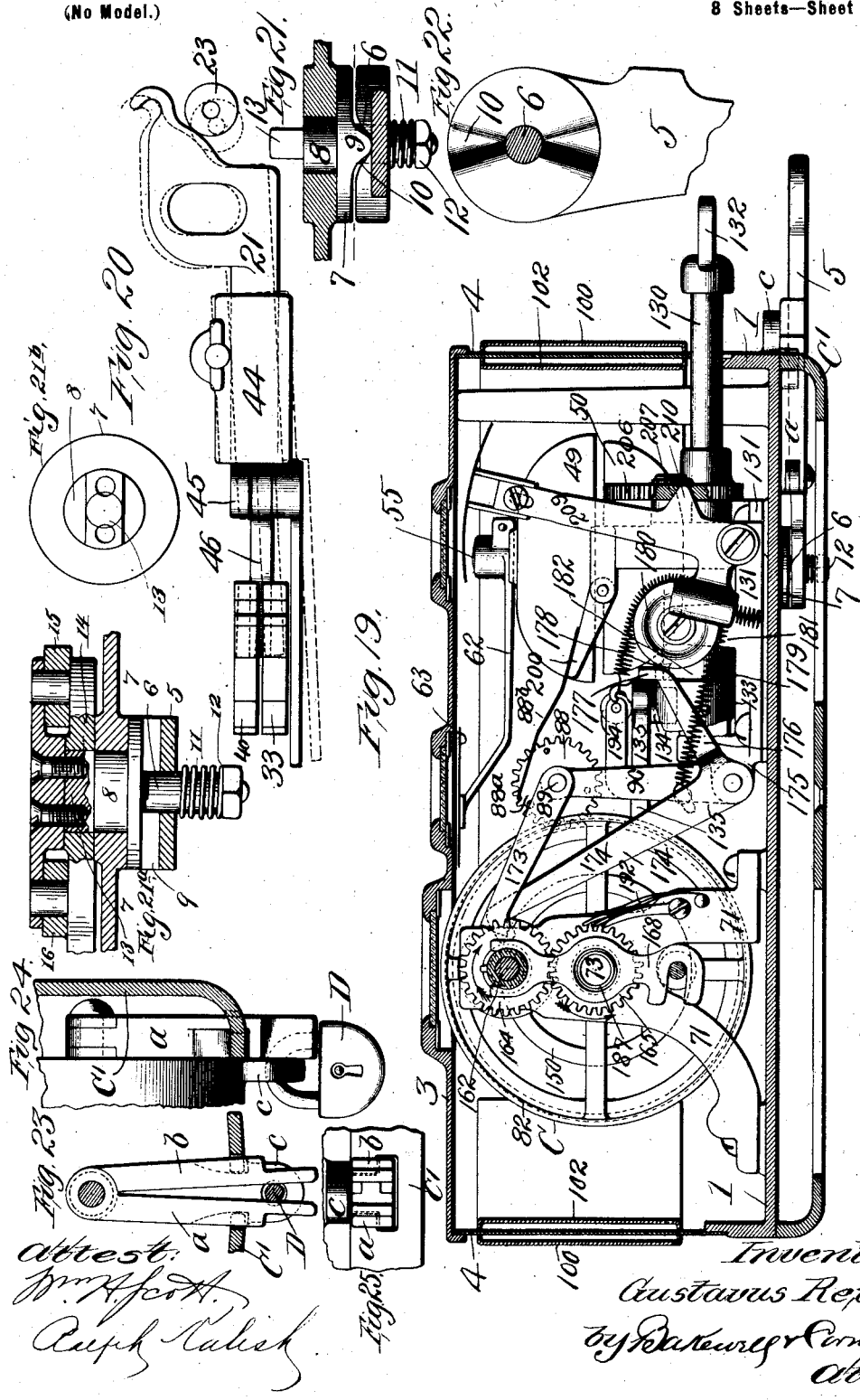

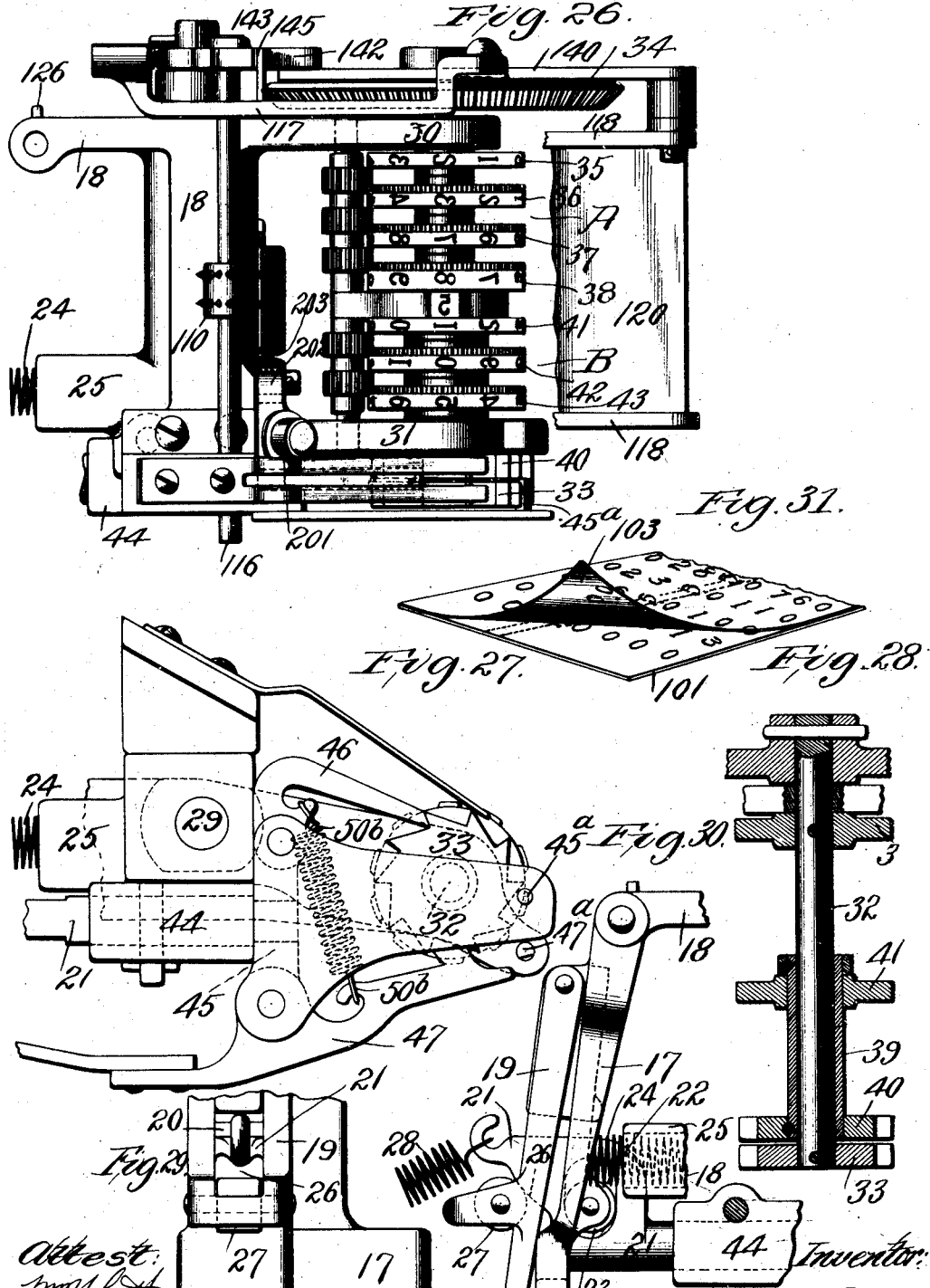

No. 624,091. Patented May 2, 1899.
G. REIN.
FARE REGISTER.
(Application filed Feb. 28, 1898.)
(No Model.) 8 Sheets—Sheet 8.
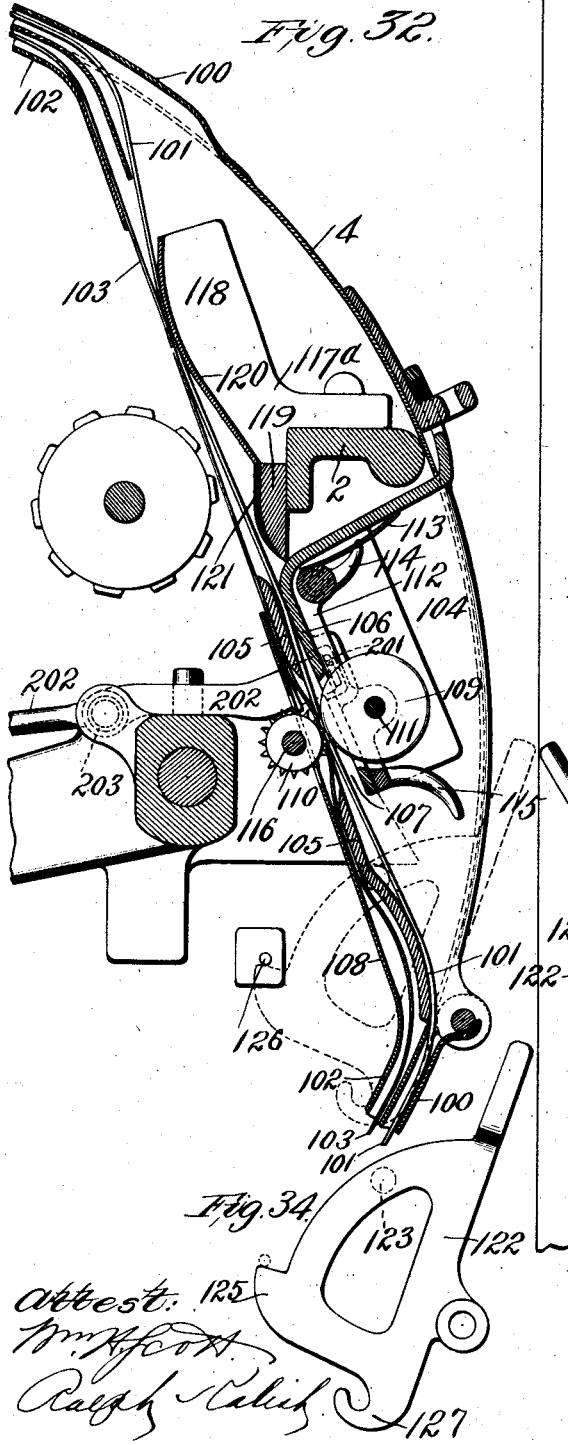
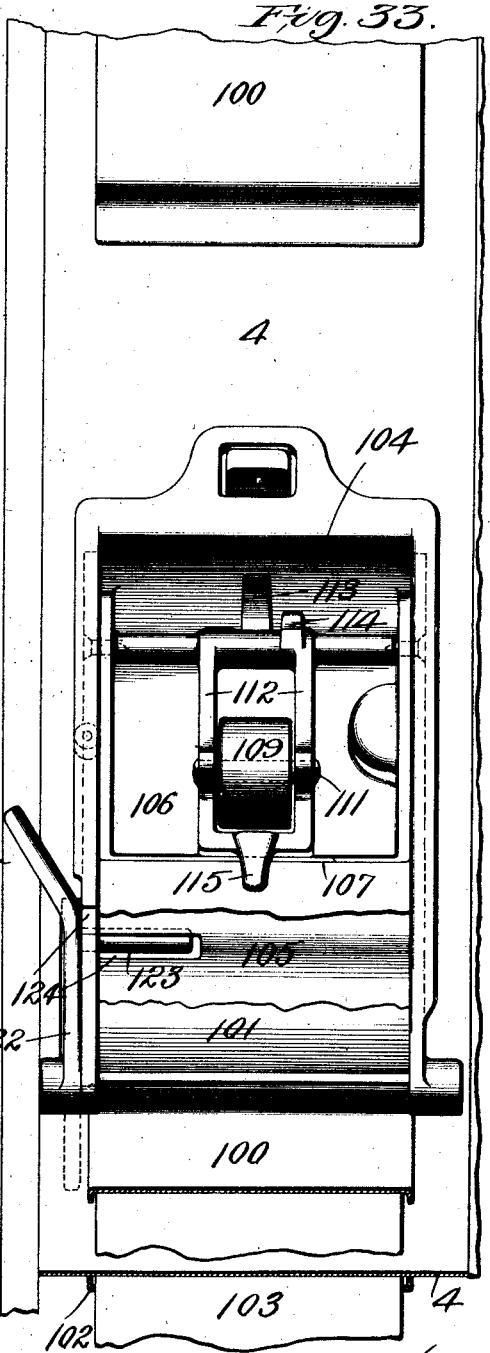
Inventor:
Gustavus Rein.
by Bakewell & Cornwall
Att'ys
Attest:
Wm H Scott
Ralph Kalish

UNITED STATES PATENT OFFICE.

GUSTAVUS REIN, OF ST. LOUIS, MISSOURI, ASSIGNOR, BY MESNE ASSIGNMENTS, TO J. W. ALLISON, TRUSTEE, OF SAME PLACE.

FARE-REGISTER.

SPECIFICATION forming part of Letters Patent No. 624,091, dated May 2, 1899.

Application filed February 28, 1898. Serial No. 672,052. (No model.)

*To all whom it may concern:*

Be it known that I, GUSTAVUS REIN, a citizen of the United States, residing at the city of St. Louis, State of Missouri, have invented a certain new and useful Improvement in Fare-Registers, of which the following is a full, clear, and exact description, such as will enable others skilled in the art to which it appertains to make and use the same, reference being had to the accompanying drawings, forming part of this specification, in which—

Figure 1 is a front elevational view of my improved fare-register, the face-plate or cover being omitted. Fig. 1ª is a rear elevational view of the handle employed to effect the printing and which is operated when the machine is set to zero. Fig. 2 is a detail front elevational view of the upper half of my improved register, the trip-register wheels and a portion of their coöperating parts being shown in section. Fig. 3 is a detail front elevational view of the lower half of my improved register and forms a companion view to Fig. 2. Fig. 4 is a sectional view illustrating a portion of the clamping device employed to return the trip-register wheels to their initial or zero position. Fig. 5 is a bottom plan view of one of the pinions, detaining-pawls, and cam or tooth with which said pinion coöperates, all of said parts being employed to carry out the recovery of the trip-register wheels in their return to zero. Fig. 6 is a face view of the pinion shown in Fig. 5. Fig. 7 is a diagrammatic illustration of the locking device for the main cam of the machine. Fig. 8 is a vertical sectional view on line 8-8, Fig. 3. Fig. 9 is a similar view showing the parts in a different position. Fig. 10 is a similar view of the front end only, showing the bell-ringing mechanism in a striking position when a cash fare is registered. Fig. 11 is a vertical sectional view on line 11-11, Fig. 1, looking in the direction of the arrows. Fig. 12 is a detail side elevational view of a portion of one of the trip-register wheels, illustrating a segment of a gear which is employed in "carrying" or transferring one number from the "units-wheel" to the "tens-wheel" in advance. Figs. 13, 14, 15, and 16 are bottom, side, top, and front elevational views, respectively, of the main cam, whose principal function is to operate the printing mechanism. Figs. 17 and 18 are elevational views of a locking-disk employed to prevent the manipulation of the trip-register wheels at an improper time, as well as to disengage the pinions which impart motion from one to another of said trip-register wheels in carrying. Fig. 19 is a side elevational view as seen from the opposite side of that from which Figs. 8, 9, and 10 are taken, the casing, base, and face-plate or cover being shown in section. Fig. 20 is a detail side elevational view showing a portion of the mechanism employed in recording either cash fares or tickets and the total thereof. Fig. 21 is a detail view of the connection between the operating-handle and the machine. Fig. 21ª is a detail vertical sectional view of the connection between the operating-handle and the machine, said view being taken transversely to that illustrated in Fig. 21 and including the rock-arm. Fig. 21ᵇ is a detail plan view of the stud and disk which coöperate with the operating-lever. Fig. 22 is a face view of the inner end of the operating-handle. Figs. 23, 24, and 25 are views illustrating the means for locking the machine to its base. Fig. 26 is a side elevational view of the printing mechanism and its adjacent parts. Fig. 27 is an inverted plan view of the same. Fig. 28 is a detail sectional view illustrating the manner of securing the printing-disks to their respective shafts, said shafts being secured to suitable ratchet-wheels, by which they are operated. Fig. 29 is a detail front elevational view of the mechanism employed to register either cash fares or tickets. Fig. 30 is a side elevational view of the same. Fig. 31 is a perspective view of the strips upon which the printing-disks have recorded the results of a number of trips. Fig. 32 is a sectional view of the printing and feeding device for the record-strips, together with their coöperating parts. Fig. 33 is a detail side elevational view of that side of the machine which is shown in Fig. 32, and Fig. 34 is a detail view of the device employed for assisting in the removal of the conductor's strip.

This invention relates to a new and useful improvement in fare-registers and is especially designed for registering and indicating the number of fares received from passengers on cars and at the same time showing upon suitable printing-disks the particular kind of fares received—i. e., either tickets or cash—and also the total of both.

By proper manipulation after a half-trip has been made the exact status of the register may be printed or impressed into suitable recording-strips. One of these record-strips is designed to be removed and turned into the company's office by the conductor, the other remaining in the machine, being accessible only to a person having a key to the register.

The register is designed to be operated by cords or rods running along the sides of the top of the car, which cords or rods are operated once for every fare received from a passenger carried by the car, the register thereby indicating the number of passengers carried on that trip by a trip-register. This trip-register registers only the number of fares received on that one trip, after which it is restored to zero, while the printing-disks before mentioned act as the totalizer, not only adding the number of fares as they are registered, but also preserving a record of the total number of fares registered on all trips.

The essential features of this invention reside, first, in the novel connection between the operating-handle and the machine, whereby the operator is prevented from too suddenly actuating the mechanism, which might by momentum throw the parts beyond their designed movement; second, in the novel mechanism employed to actuate one or both totalizers, depending upon the fare to be registered; third, in the novel bell-ringing mechanism employed, whereby when a fare of a certain class is registered an audible signal is sounded and when a fare of another class is registered a different audible signal is sounded; fourth, in the novel construction and arrangement of the fare-indicator; fifth, in the novel construction of the printing mechanism and the arrangement of the strips to be printed upon; sixth, in the novel construction of the feed mechanism for said strips; seventh, in the novel construction of the mechanism for effecting the feed of the paper strips, said mechanism in a continued movement also effecting the printing; eighth, the novel construction and arrangement of the fare-register; ninth, the coöperating devices between the fare-register and the printing mechanism; tenth, the novel mechanism employed to set the fare-register to zero; eleventh, the novel construction and arrangement of the trip-indicator; twelfth, the novel construction and arrangement of the locking devices employed to secure the register to its base, and, finally, the invention consists in the construction, arrangement, and combination of the several parts, all as will hereinafter be described and afterward pointed out in the claims.

In referring to the movement of the parts illustrated in the accompanying drawings the use of the terms "forward" and "backward," or like expressions, will be understood to mean with reference to the drawings only, that part of the machine containing the bells being called the "front end."

It is understood that the machine is usually placed in a vertical position when in use.

In the drawings, 1 indicates a back plate or casting, from which rise posts 2, to which are secured a face-plate 3.

4 indicates a suitable casing interposed between the back plate 1 and the plate 3, inclosing the mechanism employed in the register.

5 indicates an operating-lever pivotally mounted on a stud 6, said stud 6 being integral with a disk 7, which rests against the rear face of back plate 1.

8 indicates a cylindrical projection or stud rising from disk 7, which stud finds a pivotal bearing in base-plate 1. The disk 7 is provided with one or more projections 9, adapted to engage and coöperate with suitable recesses 10 in the inner end of the operating-lever 5, which is held firmly against said disk 7 by a coiled spring 11 upon the stud 6, said spring 11 being retained upon the stud 6 by a suitable nut 12. Thus it will be seen that the operating-lever 5 and the disk 7 will under ordinary manipulation move together, while a sudden movement or jerk will allow the operating-lever to move independently of the disk 7.

By adjusting the nut 12 the tension of spring 11 may be increased or diminished to regulate the friction between the handle and disk. The object of this is to prevent a sudden jerk of the handle from throwing the wheels too far, as by momentum, the handle rather moving independently under such conditions, but actuating the machine properly if said handle is moved at the proper speed.

If desired, the projections 9 upon the disk 7 and the recesses 10 upon the operating-handle 5 may be reversed—i. e., the projections could be on the operating-handle and the recesses in the disk, as is obvious.

From the cylindrical portion 8 rises a non-circular projection 13, adapted to be engaged by and secured to a rock-arm 14, said rock-arm 14 being provided with two antifriction-rollers 15 and 16. The roller 15 is designed to coöperate with an arm or lever 17, pivoted to a printing-frame 18, while the roller 16 is designed to coöperate with a lever 19, pivotally connected to the arm 17. (See Figs. 29 and 30.) The arms 17 and 19 are provided with openings 20, through which passes one end of a slide-bar 21, said slide-bar being provided with a slot or opening 22, in which a roller 23 operates, said roller being secured to the arm 17. The arm 17 is held in its normal or forward position by means of a spring 24, properly positioned in a boss 25 on the printing-frame 18.

While I have illustrated and described both the lever 17 and the boss 25 as being connected to the printing-frame 18, it will be obvious that they could as well be secured to a stationary projection attached to the back plate 1, as their connection to the printing-frame 18 is only a matter of convenience.

The slide-bar 21 is provided with an incline or cam face 26 on its forward end, which is adapted to coöperate with a roller 27, secured to the arm 19. This cam-face 26 is held to its coöperating roller 27 by means of a suitable spring 28, which spring also holds the slide-bar in its normal or forward position.

The printing-frame 18 is pivotally secured to the back plate 1 by a bolt or stud-shaft 29, said frame being formed with two arms 30 and 31, between which are mounted upon suitable shafts the printing-disks, preferably grouped in two banks A and B. The bank A is designed to record the total number of fares registered, while the bank B is designed to record only the tickets. Thus it will be seen that by subtracting the amount of tickets from the total the remainder will be the number of cash fares registered.

32 indicates the shaft which actuates the total-bank A, to the inner end of which shaft is attached a ratchet-wheel 33. 34 indicates a miter-wheel secured to the outer end of said shaft, and 35 indicates one of the printing-disks secured to said shaft 32. The remaining printing-disks 36, 37, and 38 are loosely mounted upon shaft 32 and, together with the disk 35, complete the bank A.

39 indicates a hollow shaft or sleeve which surrounds the inner portion of shaft 32, said sleeve being provided on its inner end with a ratchet-wheel 40, which is a duplicate of and closely placed by the ratchet-wheel 33.

41 indicates one of the printing-disks, secured to the sleeve 39, and 42 and 43 indicate printing-disks loosely mounted on said sleeve 39 and which, together with disk 41, form the bank B.

The slide-bar 21 is supported by and designed to slide in a support or bearing 44, pivotally mounted upon the printing-frame 18, the rear end of said slide-bar being provided with a cross-head 45, on which are mounted a pawl 46 and a bell-hanger dog 47. The pawl 46 coöperates with and actuates the ratchet-wheels 33 and 40 of the printing-disks in banks A and B, while the bell-hanger dog 47, which is simply a lever, carries upon its forward or free end a suitable clapper or hammer 48, designed to strike or ring one or the other of two bells 49 and 50, depending upon the direction in which the operating-lever 5 is operated, as will hereinafter be described.

The bells 49 and 50, which are mounted upon a suitable support, are preferably arranged one above the other and are of slightly different diameters, (or thickness,) being designed to produce different sounds, whereby the registration of one class of fares may be distinguished from that of another class. Lugs 49ª and 50ª are so arranged or located upon their respective bells as to receive the blow of the hammer 48. When the hammer 48 and dog 47 are in their position of rest, the hammer 48 is some distance in advance of the lugs 49ª and 50ª, as shown in Fig. 1, and is only in proper position to strike one or the other of said bell-lugs when the slide-bar 21 has moved sufficiently far to the rear to have caused the pawl 46 to move either or both of the ratchet-wheels 33 and 40 the proper distance. By this construction and arrangement it will be seen that the bells can only be sounded after a complete movement of the operating-handle 5 in either direction has been made, the object of this being to prevent a partial movement of the operating-handle from ringing the bells, as would be possible if the lugs 49ª and 50ª were omitted and the bells were sufficiently close to the hammer 48. For instance, if the operating-handle 5 were only moved a portion of its proper stroke the slide-bar 21, carrying the pawl 46 and the bell-hammer, would not move a sufficient distance to cause the ratchet-wheels 33 and 40 to perform their proper functions, and if in this position the operating-handle 5 were suddenly released the action of the springs 24 and 28, which recover the slide-bar and its coacting parts to their forward position, would allow the end of the dog 47, which coöperates with the ratchets, by virtue of its spring 50ᵇ to snap suddenly back to its original position in the recess in said ratchets, thus causing the hammer 48 on the free end of the bell-hammer dog 47 to strike one or the other of the bells. This cannot occur in my machine. In the construction I employ it will be observed that there is considerable distance between the hammer 48 and the bells proper when the bell-hammer is in its extreme forward position, and any movement of the operating-handle 5 other than a complete stroke will not bring the hammer into contact with the lugs 49ª or 50ª, and any vibration communicated to said hammer 48 by such partial movement of the operating-handle is insufficient to cause the bells to be struck. When the full stroke of the operating-lever is made and either of the lugs 49ª or 50ª and the hammer 48 properly register, one of the bells will be rung, depending upon the class of fare registered.

I will now describe the manner in which the character of a fare registered is indicated, so that it may be determined at a glance whether the proper class of fare has been recorded.

One end of the rock-arm 14 is provided with an arm or lever 51, designed to act as a tappet to coöperate with the arms 52 and 53 of a casting 54, secured to the lower end of a rock-shaft 55, said rock-shaft finding a bearing for its lower end in the back plate 1. A second bearing for the rock-shaft 55 is located in the bell-support 56.

57 indicates a lug projecting from one side of the rock-shaft 55 and preferably directly beneath the support 56. From this lug 57 rises a pin 58, preferably triangular in shape, which pin is adapted to coöperate with a spring-actuated tooth 59, attached to the support 56. The casting 54 is provided with a notch in one of its edges, forming shoulders 60, said shoulders 60 being designed to strike a pin or projection 61, rising from the back plate 1, thus determining the limit of movement of the rock-shaft 55. To the upper end of the rock-shaft 55 is secured a lever 62, and to the free end of said lever is secured a suitable fare-indicator 63, so shaped as to assume a proper position for reading when the rock-shaft 55 is rocked in one direction or the other. This fare-indicator contains words such as "Cash" and "Tickets," one of which is exposed when that particular class of fare to which either applies is registered.

The operation of the portion of my improved register just described is as follows: If cash fares are to be registered, the handle 5 is pulled to the left. If tickets are to be registered, it is pulled to the right, as indicated in Fig. 1. The operation in the latter case will be first described.

When the operating-lever 5 is pulled or rocked to the right, the roller 15 upon the rock-arm 14 forces the lower end of the arm 17 rearwardly, thus causing the roller 23 secured thereto to engage one edge of the slot 22 in the slide-bar 21, forcing said slide-bar 21 rearwardly through its support 44, thus causing the pawl 46, secured to the cross-head 45 of said sliding bar, to engage both ratchet-wheels 33 and 40, as in this operation the pawl 46, being sufficiently wide, engages the faces of both ratchet-wheels, causing both the shaft 32 and the sleeve 39 to partially rotate, the degree of rotation being limited by the amount of movement allowed the slide-bar 21, such movement being sufficient to move the ratchet-wheels 33 and 40, preferably the distance of one tooth, or, as the ratchet-wheels have ten teeth, one-tenth of a revolution. In both banks A and B the disks are all provided with ten characters—namely, "0," "1," "2," "3," "4," "5," "6," "7," "8," and "9"—and the disks arranged in units, tens, hundreds, &c., the disk 35, which is fixed to the shaft 32, being the units-disk in the bank A, while the disk 41 is the units-disk in the bank B. The operation of the carrying mechanism in these printing-disks is of an old and well-known construction, and as I do not claim anything relating to that mechanism I will not describe the same here other than to say that when the units-wheel makes one complete revolution it causes the tens-wheel to move the distance of one tooth, &c. As before mentioned, the pawl 46 is secured to one end of a cross-head 45, and on the opposite end of said cross-head is mounted what I have termed the "bell-hammer dog" 47, said dog 47 coöperating with and engaging the ratchet-wheels 33 and 40 on the opposite side to that on which the pawl 46 is located. As the slide-bar 21, cross-head 45, pawl 46, and dog 47 are forced in a rearward direction the pawl 46 causes the ratchet-wheels to rotate, while the coöperating end of the bell-hammer dog 47 simply slides outwardly upon the incline face of one of the teeth of the ratchet-wheel until the end of said tooth is reached. The forward end of dog 47, which carries the bell-clapper 48, is forced away from the bells 49 and 50. When the rear or coöperating end of the dog passes the end of the tooth of the ratchet, it is caused to suddenly snap into the next recess of the ratchet-wheel by means of the tension of the coiled spring 50$^b$, said coiled spring being common or attached to both, the pawl 46 and the dog 47 tending to draw them together, and thus holding them snugly against the ratchets 33 and 40. This sudden snap of the dog 47 causes the clapper 48 to strike the bell 50, thus announcing and attracting attention to the fact that a ticket fare has been registered. The arm 51 of the rock-arm 14 in this operation strikes the arm 53 of the casting 54, which is secured to the rock-shaft 55, thus causing said rock-shaft 55 to rock a sufficient distance to carry the pin 58 upon the lug 57 of the rock-shaft 55 past the center of the spring-actuated tooth 59, after which the tension of the spring-actuated tooth 59 upon the incline face of the pin 58 causes the rock-shaft to continue to rock until said rock-shaft 55 is arrested by the shoulder 60 in the casting 54 contacting with the stop-pin 61. This operation causes the fare-indicator 63, which is carried by the rock-shaft 55, to properly indicate that a ticket fare has been registered. It will be understood that if the rock-shaft 55 remains in the last-described position until another ticket fare is registered the arm 53 will not be in the path of the arm 51. Hence the rock-shaft 55 remains undisturbed in its correct position; but, on the other hand, should a cash fare be registered the arm 52 will be in the path of the arm 51, as will be explained in the following description of the operation of the register when cash fares are to be recorded.

When a cash fare is to be registered, the operating-lever, which, as stated, normally occupies a central position, is pulled to the left. This operation causes the roller 16 on the rock-arm 14 to coöperate with the lever 19, which, as before described, is pivoted to the arm 17, and as the roller 16 presses against the lever 19 the free end of said lever 19, which carries the roller 27, is forced rearwardly, thus causing roller 27 to press against the cam-face 26 on the slide-bar 21, forcing the front end of the slide-bar in an upward direction and the cross-head and its carried parts in a downward direction. The pivot of the support or bearing 44 for the slide-bar 21 acts as the fulcrum upon which said slide-bar 21 rocks. (See Figs. 10 and 20.) This operation causes the pawl 46 to slide completely off of the ratchet-wheel 40 onto the ratchet-wheel 33, thereby disconnecting the bank B from the balance of the mechanism and allowing only the bank A to be operated, which is accomplished by the continued movement of the rock-arm 14 against the lever 19, which after its initial movement (which caused the tilting of the slide-bar 21) rests against the lever 17. This continued movement causes both levers 17 and 19 to slide the bar 21 and cause the pawl to actuate but the one ratchet in a like manner to that in which the two were actuated, as described above with reference to the operation of recording ticket fares. The arm 51 of the rock-arm 14 in this operation moves in such a path as to coöperate with the arm 52 of the casting 54 and causes the shaft 55 to rock in the proper direction to bring the fare-indicator in position to correctly indicate that a cash fare has been registered in the same manner as the ticket fare was indicated, as before described. The arm 52 now being out of the path of the rock-arm 51, the fare-indicator will remain in this position as long as cash fares continue to be registered. The bell-hammer in this operation is raised, so that when its dog snaps into the ratchet-tooth it will strike the lug 49ᵃ of the upper bell, thus indicating by a different sound than when a ticket fare was registered that a cash fare has been registered.

I will now describe the trip-register.

70 indicates a casting or frame secured to the back plate 1 and is provided with two projections or supports 71 and 72, in which is mounted the trip-register.

73 indicates a shaft one end of which is journaled in the support 71, while its other end finds a bearing in a sleeve 74, integral with the units-wheel 75 of the trip-register, said sleeve 74 in turn being journaled in the support 72, preferably upon the opposite side of the support 72 to that upon which the wheel 75 is located, and upon the sleeve 74 is mounted a miter-gear 76, designed to coöperate with the miter-gear 34, located upon the shaft 32 of the printing or totalizer wheels. The shaft 73 is provided with a longitudinal groove 77, adapted to receive a key 78, said key being provided at intervals with downwardly-projecting lugs or buttons 79, designed to coöperate with incline grooves 80, which are formed in the shaft 73 and below the plane of the bottom of the key-seat proper.

81 and 82 indicate the tens and hundreds wheels, respectively, which, together with the units-wheel 75, complete the trip-register. Wheels 81 and 82 normally rest loosely on the shaft 73 and are each provided with spur-gears 83 and 84, preferably secured to the sides of said wheels 81 and 82, said spur-gears being of almost equal diameter to the trip-register wheels 75, 81, and 82. The spur-gears 83 and 84 are preferably secured to that side of the wheels 81 and 82 nearest the support 72. The wheels 75 and 81 are provided with segmental gears 85 and 86, which are arranged and secured to that side of their respective wheels nearest the support 71.

The arrangement of the gears 83 and 84 and the segments 85 and 86 is such that the gear 83 and the segment 85 are close enough together to be common to a pinion 87 and the gear 84 and segment 86 common to another pinion 88.

When the ratchet-wheel 33, which has ten teeth, is rotated the distance of one tooth, it causes the miter-wheel secured to the upper end of its shaft 32 to make one-tenth of a revolution. This causes the miter-wheel 76, which meshes therewith and which is of the same diameter and has the same number of teeth, to move the same distance, causing also the units-wheel 75, which is secured, as stated, by an integral sleeve to miter-wheel 76, to move an equal distance.

The units and tens wheels of the fare-register are each provided with ten characters—viz., "0," "1," "2," "3," "4," "5," "6," "7," "8," "9"—the hundreds-wheel being practically the same, with the exception that the character "0" is omitted, which, as is obvious, is superfluous.

The pinions 87 and 88, before mentioned, are mounted on a suitable shaft 89, said shaft being secured to the upper end of a pivoted frame 90, so arranged as to normally hold said pinions 87 and 88 in mesh with their respective spur-gears 83 and 84 and to which they impart at the proper time rotary motion.

When the wheels of the register are standing at zero, the segmental gears 85 and 86 of the units and tens wheels, respectively, are in such relation to the pinions 87 and 88 that nine-tenths of a revolution of each of the units and tens wheels is necessary to be made before said segments 85 and 86 will be in position to impart motion to the pinions 87 and 88, and pinions 87 and 88 in turn impart motion to their respective spur-gears 83 and 84. For example, assuming the register to be at zero, the segment 85 is in a position just below the pinion 87, or in the position shown in dotted lines in Fig. 8. When nine units have been registered, causing the units-wheel to have made nine-tenths of a revolution, the segment 85 will be in a position just in advance of the pinion 87 or about ready to mesh with the teeth thereof, and when another unit is added it will cause the units-wheel to make a complete revolution and indicate "0." The teeth of segment 85 in passing pinion 87 were brought into mesh therewith, causing the same to rotate a portion of a revolution, and this pinion, being in mesh with spur-gear 83, secured to the tens-wheel, causes said tens-wheel to rotate one-tenth of a revolution, bringing the figure "1" into view, the wheels of the register thus indicating the registration of ten fares. The cut-away portions of both pinions 87 and 88 receive one edge of the dial-wheels, tens and hundreds, and thus form a lock.

While I do not wish to be understood as confining myself to any number of teeth or the exact proportions thereof, I will for the sake of clearness say that the spur-gears 83 and 84 are each provided with eighty teeth, while the pinions 87 and 88 are each provided with twenty-four teeth. The segments 85 and 86 are each provided with four teeth, and when the segments 85 and 86 pass and engage the pinions 87 and 88 said segments cause the pinions to rotate one-third of a revolution or the distance of eighth teeth, thus causing the spur-gears 83 and 84 to rotate the distance of eight teeth or one-tenth of a revolution. Therefore one revolution of the units-wheel causes the tens-wheel to rotate one-tenth of a revolution, and one revolution of the tens-wheel causes the hundreds-wheel to rotate one-tenth of a revolution also.

I will now describe the function of the recording-strips to be printed upon, together with their respective pockets and other coöperating parts.

Upon the outer face of the casing 4 is arranged a pocket 100, designed to receive a strip of paper 101, known as the "conductor's strip," while the inside of said casing 4 is provided with a pocket or pockets 102, which is adapted to receive the free end of a roll of paper 103, known as the "company's strip." These pockets 100 and 102 for convenience preferably follow the contour of the casing for about three-quarters of its circumference.

A sunken panel or door 104 is arranged upon the side of the machine nearest the printing-wheels and is adapted to close an opening in the casing 4, said panel being preferably hinged at its front end and provided with a hasp at its rear end adapted to engage a perforated lug suitably secured to the casing and by which means a suitable lock may be employed to lock said panel to prevent access to the company's strip by unauthorized persons. A portion of the inner face of this panel is formed with two walls 105 and 106, thus forming a by-pass or slot 107, through which is allowed to pass the conductor's strip 101.

One end of the pocket 102 for the company's strip terminates at about the location of the hinge of the panel; but the inner wall 108 of said pocket is continued beyond the end of said pocket to about the length of the wall 105 of the panel, and the space between the panel and wall form a by-pass for the company's strip.

The walls 105 and 106 of the panel and the wall 108 are each perforated with a single opening adapted to permit the coöperating faces of the feed-rollers 109 and 110 to engage both the conductor's and the company's strips and at the proper time feed said strips simultaneously. The feed-roller 109, which is an idler, is mounted upon a shaft 111, said shaft being secured to a frame 112, preferably hinged at its rear end, said hinged portion being provided with a spring 113, the tension of which tends to force said roller tightly against the feed-roller 110.

114 indicates a projection rising from the hinged end of frame 112, which is adapted to limit the outward movement of said roller when the frame is manually pulled from its contact with roller 110 by a handle 115. The feed-roller 110 is preferably provided with sharp-pointed teeth adapted to pierce the strips 101 and 103 in order to positively feed the same and insure against said roller 110 slipping. This feed-roller 110 is secured to a shaft 116, the lower end of which finds a bearing in the back plate 1, while its upper end is journaled in a bar 117.

117ª indicates a casting secured to one of the posts 2 of the back plate 1. This casting consists of two rearwardly-extending arms 118, connected by a portion 119, said portion 119 acting as a plate for the printing-wheels in banks A and B. The arms 118 are connected on their inner edges by a suitable guide-strip 120, designed to guide the strip 101 to its pocket when said strip is being entered into the machine. I prefer to secure a strip of vulcanized rubber 121 on the face of the platen, which is adapted to prevent the sharp edges of the characters of the printing-wheels in banks A and B from becoming dulled, which might be the case if they directly contacted with the metallic platen.

To facilitate the removal of the conductor's strip, I mount, preferably upon the hinge-pin of the panel 104, a lever 122, which is provided at a suitable point with a downwardly-extending rod or projection 123. Normally this projection should rest directly against or behind the conductor's strip, the panel 104 being provided with a suitable slot 124 in its upper edge, through which said projection 123 operates. A shoulder 125 is located in a proper position on the lever 122 and is adapted to be engaged by a lock-pin 126, attached to the pivoted printing-frame 18.

127 indicates a hook formed on the inner end of the lever 122, adapted to receive one end of a spring 128, the other end of said spring being secured to the casing, its tendency being to hold the lever in the position illustrated in the drawings.

The company's strip is preferably in the form of a roll suitably mounted upon a spindle 128ª, the free end of said roll being inserted into and through the pocket 102, one end of said pocket—that end through which the free end of the strip is forced out—being almost directly behind the printing-wheels, said free end of the strip being then passed between the printing-wheels and the platen 121, after which it is passed around the wall 108 and toothed feed-roller 110 and when properly fed will be guided by walls 108 and 105 into the forward portion of the pocket 102, said pocket being sufficiently long to accommodate as much of said company's strip as a day's business will require. This company's strip being inaccessible to the conductor receives every impression from the printing-wheel and shows a complete record of that day's business. An officer of the company, carrying a key to the lock which holds the panel 104 closed, is supposed to remove this strip at the end of a day's business, to be used afterward as an office-record and as a check on the conductor's strips. During the threading of the company's strip panel 104 is open, and after said strip is in position it is closed and locked, the roller 109, arranged thereon, being brought to its proper registration with the toothed roller 110, thereby tightly gripping said strip 103.

The conductor's strip is designed to be threaded into the machine when the panel 104 is closed and, in fact, passes through said panel. To insert the conductor's strip, the handle 115 is raised against the tension of spring 113 until the stop-lug 114 strikes the rear wall of the panel, at which time the roller 109 is disengaged from contact with the strip 103 and roller 110, thus allowing a free and unobstructed passage for the conductor's strip into the by-pass or slot 107 between the walls 105 and 106 of the panel and by which said strip is guided in its movement between the printing-wheels and the platen and past the guard 120 into one end of its pocket 100, said end of pocket 100 being located in about the same relative position to the printing-wheels as is the end of pocket 102.

The greatest portion of the conductor's strip, which is in practice about eighteen inches long, is, as before stated, forced rearwardly into pocket 100 until the other end of the strip is reached, which other or forward end is then started into the other or forward end of pocket 100, said front end of the conductor's strip terminating at about the location of the hinge of the panel 104. After this threading of the conductor's strip the handle 115 is released, and by virtue of the spring 113 the roller 109 is forced tightly against both strips 101 and 103 and the toothed feeding-roller 110, the roller 109 forcing the strips sufficiently hard against the roller 110 to cause said strips to be pierced, and as the feed-roller 110 is driven a positive feed for said strips is insured.

Having explained how the different kinds of fares are accumulated or added together upon the totalizer or printing wheels and how the total of fares of any one trip are added and registered on the trip-register and also how the different strips—the company's and conductor's—are arranged relative to the printing-wheels and the platen and their respective coöperating parts, I will now describe the next operation of the register, which is to print the state of the totalizer, and thus record the result of the trip. I desire first to explain that in using the word "print" I do not wish it understood that ink, ink-ribbons, or any like agent is employed in the machine illustrated, although such may be used, if desired. The printing is accomplished by impressing characters into the two strips of paper.

130 indicates a shaft suitably journaled in a frame 131, secured to the back plate 1. The front end of said shaft is provided with a handle or thumb-piece 132, located outside the machine, whereby said shaft may be manipulated.

133 indicates a cam secured to the inner end of shaft 130, which cam is designed to coöperate with a roller 134 on an arm 135, integral or secured to the printing-frame 18. The construction of this cam is clearly shown in Figs. 13, 14, 15, and 16 of the drawings.

When the machine is in its normal position—i. e., either before or after any number of fares has been properly registered—the free end of the arm 135, carrying the roller 134, is in a forward position. The roller 134 finds a rest in a recess 136 on the cam 133. In order to print, the handle 132 is operated from right to left, as indicated by the arrows thereon, this movement causing the free end of the arm 135 to move rearwardly by virtue of the roller 134, riding upon the inclined face 137 of said cam. The cam is permitted to rotate a sufficient number of degrees to allow the roller 134 to completely rise out of recess 136 and rest upon the rear face of the cam, at which time the rotation of the cam is arrested by reason of a pin 138, arranged on the side of the cam, contacting with a sliding bar 139 in its path. This movement of the arm 135 has caused the printing-frame 18 to rock upon its pivot-shaft 29, and thus cause the printing-wheels of banks A and B to move in the direction of the strips and platen, such movement being sufficient to impress the characters on the peripheries of the printing-wheels in line with the platen into both of the strips. In this connection I prefer to use thin paper for the company's and comparatively thick paper for the conductor's strips. The conductor's strip, if thick enough, acts practically as a platen itself. Before the printing is accomplished, however, the initial movement of the rocking of the printing-frame upon its shaft effects the feeding of the strips 101 and 103, said feeding being completed just before the printing-wheels make their impression. The construction and operation of this paper-feed mechanism are as follows: 140 indicates a lever one end of which is pivotally secured to one of the arms 118 of the casting 117ª, said lever being provided with a slot 141, adapted to receive the boss of the miter-wheel 34, secured to the upper end of the shaft 32, which in turn is journaled in the printing-frame 18. To the free end of this lever 140 is pivoted one end of a pawl 142, the free end of said pawl coöperating with a ratchet-wheel 143, secured to the upper end of the feed-roller shaft 116, said pawl 142 being held in its proper relation to said ratchet-wheel 143 by a spring 144, suitably secured to the lever 140. One end of the bar 117, in which the upper end of the feed-roller shaft is journaled, is secured to post 2 of the back plate 1, while its other end rests upon the printing-frame 18 and is preferably secured to the pivot-shaft 29 of the printing-frame. From this bar 117 and in proper relation to pawl 142 and ratchet 143 rises a pin 145, located in the path of travel of pawl 142. The arm 118, to which one end of the lever 140 is pivoted, is stationary, while the shaft carrying the miter-gear moves in an arc of a circle from the shaft 29, and, as stated, the boss of said miter-gear passes through a slot in the lever 140. Said lever is caused to swing upon its pivot and cause the pawl 142, attached to its free end, to coöperate with the ratchet 143, causing said ratchet to rotate the distance of one tooth, after which the inclined end of the pawl 142 will have been brought into contact with the pin 145, thereby raising or forcing the pawl out of engagement with the ratchet-wheel, thus disconnecting the feed of the paper and allowing the strips to be brought to a state of rest, after which the continued movement of the printing-frame accomplishes the printing, as described. A detaining-pawl 142$^a$ is employed in connection with the ratchet.

I will now explain the function, operation, and construction of the sliding bar 139 and its coöperating parts.

150 and 151 indicate two duplicate notched disks, suitably clamped or secured to the hubs or bosses of the units and tens wheels, respectively, said disks being secured to the hubs nearest each other and are preferably quite close together. Between these disks a bar 152 operates, which bar 152 supports two cam-rolls 153, arranged one on either side, said cam-rolls being adapted to coöperate with disks 150 and 151, and when the trip-indicator is clear or no fares registered the cam-rolls 153 find a seat in the registering notches 154 in said disks. One end of bar 152 is supported by shaft 73 of the trip-indicator, which passes through an elongated opening or slot 155 in said bar, while its other end is secured to the slide-bar 139, said slide-bar being mounted in suitable guides or supports 156, rising from frame 131. One end of slide-bar 139 is preferably reduced in size and is surrounded by a coil-spring 157, one end of said spring bearing against a shoulder on said bar, while the other end bears against one of the supports 156, said spring tending to force the slide-bar 139 and bar 152 rearwardly to cause the cam-rolls 153 to press upon the peripheries of the disks 150 and 151 when either or both of said disks are in a position other than normal. When the disks are in their normal position, the rolls 153 will be forced into the notches 154, as is the position shown in Fig. 8.

The slide-bar 139 is provided with a notch 158, so placed and arranged as to register with the pin 138 when the machine is clear; but if the units or tens wheels of the trip-register indicate any number of fares registered the rotation of either of said wheels carrying their respective disks 150 and 151 causes either of said disks to force the cam-rolls 153 out of the notch 154, said cam-rolls then resting upon the peripheries of said disks 150 and 151, thus sliding the bar 152 and the slide-bar 139 against the tension of the spring 157, bringing the notch 158 out of registration with the pin 138. The pin 138 will strike the bar 139, except in the position when the notch 158 registers with said pin. The rotation of the cam 133 is arrested at this point. When the rotation of the cam 133 and the shaft 130 has been arrested by the contact of the pin 138 with the slide-bar 139, the handle 132 on the outer end of said shaft 130 will have sufficiently turned and presented its opposite face to expose the inscription "Enter strip—Turn home," the first words "Enter strip" meaning that the machine is in a correct position to allow the conductor in charge to withdraw his record-strip from the machine and permit him or another conductor to insert a new record-strip in the event of the old strip being filled or a change of conductors takes place. The latter portion of the phase "Turn home" denotes that the parts are in proper position to clear the machine or restore the trip-register to zero, which is accomplshed by the proper manipulation of the handle 160, located outside the casing 4 and preferably upon the opposite side of the machine to that upon which the panel or door 104 is located. I will state here that the handle 132 cannot be moved backward to a home position by reason of a dog $x$ engaging notches $y$ in the body of the cam 133, and therefore if any fares have been registered on the last trip the cam is locked in its position by the engagement of its pin 138 with the bar 139, preventing a forward movement, and the dog $x$ preventing a backward movement.

The handle 160 is secured to one end of a hollow shaft or sleeve 161, said sleeve being loosely mounted in one of the posts 2 of the back plate 1.

162 indicates a shaft, one end of which is received by the sleeve 161, said shaft being journaled in support 71 of the frame 70 and provided on its inner end between said support 71 and the hundreds-wheel 82 of the trip-register with a notched disk 163.

164 indicates a spur-gear secured to the shaft 162 and located between post 2 and support 71, said gear meshing with a gear 165, preferably of the same diameter, said last-named gear being located upon the end of the shaft 73 and placed directly beneath the gear 164. The sleeve 161 is provided with a tooth or projection 166 on its inner end, which is received in a recess 167 in the outer face of post 2, said projection being held in engagement with the notch by one end of a spring 168, said spring being preferably forked, the fork being received by a groove 169 in sleeve 161. The lower end of this spring 168 is secured to the post 2.

170 indicates a slot formed in sleeve 161 and through which a pin 171 passes, which pin is secured to shaft 162, by which the sleeve may be pulled outwardly, thus withdrawing the tooth 166 out of recess 167 and permit ting the rotation of said sleeve and shaft when the handle is turned in the direction as indicated by the arrow thereon.

Disk 163 is provided with a notch 172, adapted to receive and coöperate with the ends of two levers 173 and 174, lever 173 being secured to one end of shaft 89, mounted in the pivoted frame 90, upon which the pinions 87 and 88 are loosely mounted. The lever 174 is pivoted to the outer face of a lug 175 on the frame 131. From the pivot-point of this lever an arm 176, which, together with arm or lever 174, forms a bell-crank lever, projects and is so shaped as to cause its free end 177 to rest upon or in the path of rotation of a projection 178, formed on cam 133. To one of the members of this bell-crank lever, preferably 174, is attached one end of a coiled spring 179, said spring passing around a roller 180, pivoted to a lug 181, rising from the frame 131, the other end of said spring being attached to the outer end of the arm 135 of the printing-frame. From the foregoing it will be seen that this spring performs a dual function, one being to cause the cam-roll 134 upon arm 135 to be held to its contacting position with cam 133, which tendency also causes the printing-wheels carried by the printing-frame at the proper time to be withdrawn from the strips 101 and 103 after an impression, the other function being to pull the bell-crank lever and its arms 174 and 176 in such a direction as to cause the portion 177 to rest upon the projection 178 of the cam 133 when said cam is in a normal position and to compel said portion 177 to rest upon the periphery of the portion 182 of cam 133 when said cam is in an abnormal position, thus allowing the end 183 of the arm 174 to become disengaged from the notch 172.

Assuming the machine to now be in the position last named—i. e., the handle actuating the cam 133 sufficiently so that the inscription before mentioned, to wit, "Enter strip—Turn home," will be exposed—the projection 178 on said cam 133 will have passed from beneath the portion 177 of arm 176 and the spring 179 will have pulled the bell-crank lever until the portion 177 has been arrested by the portion 182 of the cam 133, this movement being, as before described, sufficient to cause the withdrawal of the end 183 of arm 174 out of engagement with notch 172 of disk 163. When in this position, the handle 160 and sleeve 161 are pulled outwardly against the tension of spring 168 until the tooth 166 on said sleeve is disengaged from the recess 167 in post 2. The sleeve 161 and handle 160 are then rotated in the direction of the arrow on said handle, thus causing the shaft 162, by virtue of the pin 171, to rotate, causing the gear 164, secured to said shaft 162, to impart rotary motion to the gear 165 on the shaft 73. This gear 165 is provided with a notch 185, preferably arranged on its inner side, said notch being adapted to normally engage a tooth 186, suitably secured to the support 71.

Thus the initial rotary movement of this gear 165 in its proper direction causes said gear to be forced away from the support 71 by the inclined face of notch 185 riding upon the inclined face of the tooth 186, and after said notch has traveled past the tooth 186 the face of said gear 165 will ride upon the end of tooth 186, thus keeping said gear in an outward position until one revolution of said gear has been made, after which said gear 165 will be forced back into its normal position by means of a spring 187, arranged between the outer side of said gear and post 2.

Interposed between the hub of the wheel 82 of the trip-register and the support 71 and surrounding the shaft 73 and its key 78 is a collar or distance-piece 188, and through a suitable opening or hole in said collar a screw or pin is inserted and secured into one end of key 78 to prevent any longitudinal movement thereof. When the gear 165 and the shaft 73 are in their normal position, the top of the key 78 is slightly within the line of the shaft 73; but when said shaft is moved longitudinally, as just described, the recesses or cam-faces in said shaft contact with the buttons on the key, crowding said key outwardly and binding all of the register-wheels to the shaft. When the wheels are thus bound by friction, a continued movement of the handle will restore the wheels to zero, which zero position is determined by a stop or projection 190, arranged thereon, which stop or projection contacts with a projection on a spring-pressed pivot-arm 191, as shown in Fig. 8. The rollers 153, falling in notches 154 of disks 151, would answer as stops; but I prefer to provide additional devices, as just described. Irrespective of the position of the free register-wheels they will be turned backwardly until their respective stops contact with the projections on arms 191, after which the shaft 73 continues to rotate, although with slight friction, until the tooth 186 enters the notch 185, when the spring 187 will force the shaft 73 longitudinally out of engagement with the buttons or projections on the key, thus releasing all the register-wheels. A series of detaining-pawls 192 engage the teeth on pinion 165 to prevent backward rotation of the handle 160. I will also state here that should any of the register-wheels make more than one revolution during a trip the stop 190 can freely ride over the arm 191 by depressing the same. The handle 160 now having been returned to its normal position its projection 166 will enter the recess 167 in the post 2, thus notifying the operator, by which time the notch in the disk 163 will have registered with the ends of levers 173 and 174, permitting said levers to fall thereinto, as shown in Fig. 8. Likewise the rollers 153 will be seated in the notches in the rings or disks 151, registering notch in bar 139 with pin 138 on the cam. This permits the handle 133 to be rotated further, which further rotation will cause the inclined face 133ª on the cam to engage the roller 134 on arm 135 and effect a second type impression on the strips of paper. This second type impression occurs in the same place as the type impression before described, the object of this being to print the condition of the register on a new strip should one have been inserted since the last impression. A continued movement of the handle will rotate the cam until the roller 134 drops into the deepest recess in the cam, which is the normal position of said roller, at which time the arm 135 will move forward, forcing a roller 194, mounted in lugs extending forwardly from the frame 90, in an upward direction, which causes the pinions 87 and 88 to engage with their respective gears. This movement also causes the lever 173 to enter its notch in the disk 163, and at the same time the rise or knob 178 on the cam 133 forces up the forward member of the bell-crank lever 174, causing said bell-crank lever to engage with its notch in the disk 163.

The pinions 87 and 88 are provided with pins $87^a$ and $88^a$ in their side faces, which pins, preferably three in number, are placed equidistantly apart and are adapted to coöperate with spring-blades $87^b$ and $88^b$, mounted on a pivoted frame 200, which is provided with a suitable torsional spring, causing the spring-blades to engage with their pins to hold the pinions in the correct position for reëngagement with the gears on the register-wheels after said register-wheels are returned to zero. These spring-blades practically coöperate with the pins on the pinions only while the pinions are out of engagement with their respective gears.

During the time that the parts of the machine were in position to enable their return to zero certain devices were operative which prevented the manipulation of the handle 5, which devices I will now describe.

When the arm 135 is in a forward position, it permits a roller 195, mounted in a spring-raised pivoted frame 196, to remain in an elevated position; but immediately after a movement of arm 135 to the rear and during its retention in such rearward position, as when the trip-register is being returned to zero, said arm 135 depresses the roller 195 and rocks frame 196, which rocking causes a casting 197 on the forward end of said frame to be depressed or forced downwardly over the projection 51, which has been before described as causing the operation of the fare-indicator. This casting 197 practically incloses the projection 51, so as to prevent any manipulation whatever which would tend to effect the registration of a fare.

Another device which I employ in my machine and which I consider quite important is the use of mechanism to prevent the registration of fares in the machine during the absence of the conductor's strip, and to accomplish this I provide a roller 201 on the end of a pivot-lever 202, the other end of said lever extending over and engaging a rearward projection $196^a$ on the frame 196. Under this lever 202 is a spring 203, whose strength is sufficient when the roller 201 is not depressed to force the inner end of lever 202 downwardly, causing the frame 196 to rock and its carried casting 197 to engage the projection 51. The presence of the conductor's strip by engaging the roller 201 nullifies this tendency of the spring 203 and permits the frame 196 to keep its raised position, which means the disengagement of the casting 197 from the projection 51.

As the machine is operated to effect the printing and restoration of the trip-register to zero, it is also desirable to actuate the trip-indicator, which shows through the face of the register and indicates the direction of the trip, as "Up," "Down," "East," "West," &c. This trip-indicator is operated by providing a pinion 205 on the shaft 130, which pinion meshes with a gear 206, suitably mounted, said gear 206 being provided with recesses 207 in its face, diametrically opposite to which is a projection 208.

209 indicates a spring-pressed lever (best illustrated in Fig. 19) which carries a point 210 to engage the recesses and projection on the wheel 206. The upper end of this lever carries a plate $109^a$, containing the words "Up," "Down," &c., between which is preferably a color portion $109^b$, which if exhibited through the face of the register indicates that the parts are not in their proper position for registration. As the handle 132 is rotated the projection 210, we will say, rides out of the recesses 207 and onto the face of the cam, exhibiting a color-strip through the face of the register. One revolution of shaft 130 will rotate the pinion 206 one-half a revolution, the gearing being one to two, and as the handle 132 reaches its home position the projection 208 will be forced under the point 210, throwing the trip-indicator the remaining one-half of its movement.

Provision is also made to lock the cam 133 in an inoperative position when the operating-handle 5 is out of its normal position. This is best shown in Fig. 3, where 211 indicates a flange, preferably on the forward edge of the rock-arm 14. This flange is provided with a notch or recess, as shown, in which is fitted the end of a lever 212, which is held in said notch preferably by a spring 28, whose other end is attached to the forward end of the slide-bar 21. This lever 212 forms one member of a bell-crank lever, of which an arm 213 is the other member. These two members are pivoted at the same point, but independently movable. A leaf-spring 214, secured to one member and engaging the flat face of the other, tends to cause said members to move together, but permits an independent movement of said members under certain conditions. The free end of the member 213 extends laterally to a point beneath the cam 133, which is formed with a flat face $133^b$ for coöperating with the end of member 213 whenever the operating-handle 5 is moved to the right to register ticket fares. The flange 211 forces the member 212 outwardly or forwardly, the spring 214 being of sufficient strength to force the free end of member 213 under the flat face 133$^b$ of the cam, thus preventing the cam from being rotated. When the operating-handle 5 is moved to the left to register cash fares, the flange 211 engages the cam-face 212$^a$ on the end of the lever 212 and forces the same forwardly in like manner to accomplish the locking of the cam 133, as before. Should the cam be rotated so as to prevent the member 213 from moving thereunder and should there be a slight movement of the projection 51 in the recess in casting 197, which is supposed to lock said projection in place to prevent the rocking of arm 14, and the operating-handle 5 is permitted a limited movement, the member 212 would move slightly, the spring 214 yielding to permit this. In this way the parts are not liable to be strained or damaged.

I will also state that when the slide-bar 21 is moved to the rear a pin 45$^a$, carried on the rear end of the cross-head 45, moves out of the path of the ratchet-wheels 33 and 40 and permits their rotation, said pin when the slide-bar is in a forward position passing in front of the teeth and preventing any rotation thereof. (See Fig. 27.) A pin 47$^a$ is also provided to hold the bell-hammer dog 47 away from the teeth of the ratchet-wheel to prevent the bell-hammer from striking twice should a sudden movement throw the ratchet-wheels 33 and 40 the distance of two teeth, which might result from momentum.

A lock is provided to prevent the removal of the conductor's strip when the handle 132 is in a home position. This lock is best shown in Fig. 1, and consists of a pin 126, mounted on the forward end of the printing-frame, which pin when the printing-frame is in its normal position is located behind a shoulder 125 on the lever 122. When the handle 132 is rotated to disengage the totalizer from the trip-register by rocking the printing-frame on its stud-shaft 29, the pin 126 will be moved out of the path of the shoulder 125, when said lever 122 may be operated so that its pin 123 will engage the conductor's strip and force the same outwardly, so that it can be readily grasped.

In mounting registers in cars the base is usually secured to the wall of the car and the register mounted in said base, where it is locked in position. This enables the register to be removed at any time by the use of a key to unfasten the lock without unscrewing the base. I have provided a novel lock for securing the register to its base, which will now be described. This lock is best illustrated in Figs. 23, 24, and 25, and consists of two jaws $a$ and $b$, pivoted to the back of the back plate of the register. These jaws have recesses in their sides to engage suitable projections in the base C'. The register back plate is also provided with a hasp $c$. D indicates a lock whose bolt when inserted through the hasp $c$ spreads the jaws $a$ and $b$, causing their engagement with the back plate C', firmly holding the register in place. When it is desired to remove the register from its base, the lock may be taken out and the jaws collapsed.

In practical operation it frequently happens that conductors have a certain number of trips to make in a given time, after which they are relieved for meals, the relief-man and the conductor each turning in separate reports as to the business done when each was in charge of the car. By the use of my machine when fares are registered at the end of a trip the printing of the business of that trip is accomplished as described and the trip-register returned to zero. This continues, we will assume, during the time that one person is in charge of the car. Should conductors be changed, as when the relief-man goes on, the regular conductor turns the handle 132 and prints the amount registered up to the time he leaves the car and takes out his strip. The new man introduces his strip, and if the trip-register is to be set home does that and returns the handle 132 back to its original and normal position, which latter movement of the handle 132 causes an impression to be made on the new strip in the same place where the impression was made on the removed strip. These two impressions succeeding each other indicate on the newly-inserted strip the condition of the register at the time said strip was inserted, and in this way it is impossible to insert or remove the strip without printing the condition of the register at the time the strip was inserted and finally printing the condition of the register just previous to the removal of the strip. To illustrate the printing on two strips, we will say that the following appears on a strip which has just been removed:

| 112 | = ⊶ = | 610 |
| 109 | = ⊶ = | 604 |
| 107 | = ⊶ = | 599 |
| 102 | = ⊶ = | 589 |
| 097 | = ⊶ = | 579 |

The lowest figures in the above indicate the condition of the register at the time the strip was inserted, and the upper figures indicate the condition of the register at the time the strip was removed. We will now assume the following to be the record of the next strip inserted:

| 127 | = ⊶ = | 640 |
| 124 | = ⊶ = | 634 |
| 120 | = ⊶ = | 626 |
| 115 | = ⊶ = | 616 |
| 112 | = ⊶ = | 610 |

In this it will be seen that the lowest figures correspond with the last figures printed on the strip previously removed, as set forth in the above example.

Referring back to the first example, being the record of the first strip removed, we find that the condition of the register shows that ninety-seven cash fares have been registered and five hundred and seventy-nine cash and ticket fares have been registered. At the end of a trip when the register was returned to zero the record shows that a total of one hundred and two cash fares is exhibited in the machine, which means that five cash fares were added in the totalizer plus ninety-seven fares already registered, making one hundred and two cash fares altogether. The strip also shows five hundred and eighty-nine cash fares and tickets as a total, which is ten more than were in the machine at the beginning of the trip. As five cash fares have been registered on the trip and ten fares, both cash and ticket, have been registered, it follows that five tickets were registered, as well as five cash fares. In other words, by subtracting the number of cash fares from the total number of fares registered the number of ticket fares can be easily ascertained.

The central column of figures, which are preferably so arranged as to be read from the side, appear at each impression of the type on the paper and indicate the number of the register making the impression. I prefer to have the number of the register read in this way, so as not to be confused with the number of cash and ticket fares printed on the strips.

I am aware that many minor changes in the arrangement, construction, and combination of the several parts of my machine can be made and substituted for those herein shown and described without in the least departing from the nature and principle of my invention.

Having thus described my invention, what I claim, and desire to secure by Letters Patent, is—

1. The combination with a fare-register, of an operating-handle therefor, and a yielding connection between said handle and said register, whereby a sudden movement imparted to the handle will cause said handle to move independently of the register mechanism, substantially as described.

2. The combination with a fare-register, of an operating-handle therefor which is movable independently of the register mechanism, and a spring for forcing said handle into engagement with the registering mechanism, said spring yielding and permitting independent movement of the handle when said handle is actuated too rapidly, substantially as described.

3. The combination with registering mechanism, of a disk for actuating the same, projections or notches in said disk, an operating-handle pivoted in juxtaposition to said disk and having converse parts to coöperate with the projections or notches on said disk, a spring bearing against said operating-handle, and means for regulating the tension of said spring, substantially as described.

4. In a fare-register, the combination with an operating-handle, of a rock-arm actuated thereby, a totalizer comprising two banks, a pawl which normally engages both banks of said totalizer, a lever on which said pawl is mounted, which lever is actuated when the rock-arm is moved in one direction, so that said pawl will operate both banks of the totalizer, and means, operated by said rock-arm when moved in an opposite direction, for tilting said lever so that said pawl will operate but one bank of the totalizer; substantially as described.

5. The combination with a rock-arm adapted to move in two directions, of levers which coöperate with said rock-arm, one lever being actuated when the rock-arm is moved in one direction, and both levers being actuated when the rock-arm is moved in another direction, pawls operated by said levers, and a totalizer with which said pawls coöperate, substantially as described.

6. The combination with a rock-arm, of a lever which is engaged when said rock-arm is moved in one direction, a lever which is engaged when said rock-arm is moved in another direction, a sliding and tilting bar which is actuated by said levers, pawls carried by said bar, and a totalizer with which said bar coöperates, substantially as described.

7. The combination with a totalizer comprising two banks, pawls for actuating one or both of said banks, a sliding bar carrying said pawls, a pivoted support or bearing in which said bar is mounted, a rock-arm, and means interposed between said rock-arm and sliding bar, whereby, when said rock-arm is moved in one direction, the sliding bar is forced in a straight line through its pivoted supporting-bearing, so that its carried pawls will actuate both banks, and when said rock-arm is moved in the opposite direction, a longitudinal and tilting motion is imparted to said sliding bar, so that its carried pawls will actuate but one bank of the totalizer; substantially as described.

8. The combination with a totalizer, comprising two banks with separate ratchet-wheels, of pawls which operate one or both of said ratchet-wheels, a bar on which said pawls are mounted, a pivoted supporting-guide or bearing for said bar, levers 17 and 19, coöperating with the forward end of said bar, and a rock-arm coöperating with said levers, whereby, when the lever 17 is actuated, the bar is forced rearwardly in a straight line, and both banks of the totalizer are operated, and when the lever 19 is operated the bar is forced rearwardly and tilted so that but one bank of the totalizer is operated; substantially as described.

9. The combination with a totalizer, of pawls for actuating the same, a sliding and tilting bar carrying said pawls, said bar having a cam-face on its forward end, a lever for causing a rearward movement of said bar, a lever engaging said cam-face for causing a tilting movement thereof, means for operating said levers, and a spring for normally holding said bar in a forward position, substantially as described.

10. The combination of a totalizer, comprising two banks, of pawls for actuating one or both of said banks, a sliding and tilting bar carrying said pawls, said bar having cam-face on its forward end, a pivoted bearing for said bar, a lever engaging in a vertically-elongated slot in the forward end of said bar for causing its straight rearward movement, a lever engaging cam-face of said bar for tilting the same, and causing its rearward movement at the same time, and means for operating said levers independently of each other; substantially as described.

11. The combination with a totalizer for registering one class of fares, of a totalizer for registering all classes of fares, independently-movable ratchet-wheels for actuating said totalizers, a pawl which engages one or both of said ratchet-wheels, and means for operating said pawl so that it will engage one or both of said ratchet-wheels depending upon the class of fares registered, substantially as described.

12. The combination with a totalizer for registering one class of fares, of a totalizer for registering all classes of fares, companion ratchet-wheels connected to their respective totalizers, a pawl for engaging one or both of said ratchet-wheels, a sliding and tilting bar carrying said pawl, and means for causing said bar to slide, or to slide and tilt, depending upon the class of fares to be registered, substantially as described.

13. The combination with a totalizer comprising two independently-movable banks, ratchet-wheels for operating their respective banks, a pawl which normally engages both ratchet-wheels, a sliding bar which carries said pawl means for sliding said bar so that both banks of the totalizer will be actuated, and means for sliding and tilting said bar so that but one bank of the totalizer will be actuated, substantially as described.

14. The combination with a totalizer, comprising two banks, and means for operating one or both of said banks, said means comprising a pawl which engages one or both of said banks, mechanism for operating said pawl, so that it will engage one or both of said banks, depending upon the class of fares to be registered; of two bells which are sounded separately when one or both of said banks are actuated, a bell-hammer, and a pawl for operating said bell-hammer, which hammer and pawl are contemporaneous in their movement with respect to the pawl which operates one or both of the totalizer-banks; substantially as described.

15. A totalizer, comprising two banks, mechanism for operating one or both of said banks, which mechanism comprises a sliding and tilting bar, with means for sliding said bar in a straight line to operate both banks, or for sliding and tilting said bar to operate a single bank; in combination with the above, of a bell-hammer pawl mounted on the sliding and tilting bar, so as to carry the hammer into registry with one or the other of two bells whenever said bar is actuated, and two bells; substantially as described.

16. The combination with a bell having a projection or lug, of a bell-hammer which is normally out of register with said lug, whereby, should said hammer be vibrated, it will strike into space, substantially as described.

17. The combination with a bell having a lug or projection, of a bell-hammer which is normally in advance of said lug, and means for moving said bell-hammer to the rear in line with said lug and imparting a vibration to said hammer when in said rearward position, substantially as described.

18. The combination with a plurality of ratchet-wheels for actuating the banks of a totalizer, of a sliding and tilting bar for actuating one or more of said ratchet-wheels, mechanism for sliding said bar, and for sliding and tilting said bar, a bell-hammer pivotally mounted on said bar, and which is thrown into engagement with one or more ratchet-wheels as the bar is tilted, and a plurality of bells with which said hammer coöperates; substantially as described.

19. The combination with a sliding and tilting bar, and means for operating the same, of a totalizer comprising two banks, a pawl carried by said bar for actuating one or both of said banks, a bell-hammer carried by said bar, and which is actuated by one or both of said ratchet-wheels, and two bells, having projections or lugs which are normally out of register with the bell-hammer, but with which the bell-hammer registers when said bar is slid longitudinally, and slid and tilted; substantially as described.

20. The combination with a sliding and tilting bar, and means for operating the same, of a spring for normally holding said bar in a forward position, a totalizer comprising two banks, which are operated when said bar is moved longitudinally, and moved longitudinally and tilted, the bell-hammer, which is pivoted to said bar, a spring for forcing one end of said hammer into engagement with one or both totalizer-banks, and two bells, which are pivoted with locks, with which the bell-hammer coöperates; substantially as described.

21. The combination with dial-wheels, of means for transferring numbers from one wheel to the next wheel in advance, a longitudinally-grooved shaft on which said wheels are loosely mounted, and said groove being formed with a plurality of inclined faces, a key operating in said groove, the outer face of said key being furnished the periphery of the shaft, and a plurality of projections on said key for coöperating with said cam-faces to force said key outwardly and lock the wheels to the shaft when there is a relative longitudinal movement between said key and shaft; substantially as described.

22. The combination with independently-movable dial-wheels, of a grooved shaft on which the same are mounted, inclined recesses in said groove, a key fitting in said groove, projections on said key adapted to engage the inclined walls forming the recesses in said shaft, and means for moving said shaft longitudinally to force the key outwardly to lock the wheels to the shaft, substantially as described.

23. The combination with dial-wheels, of a grooved shaft on which the same are mounted, a key arranged in said groove, a pinion mounted on the end of the shaft, a cam-face coöperating with the face of said pinion for moving the same, and the grooved shaft longitudinally to lock the dial-wheels to said shaft, substantially as described.

24. The combination with dial-wheels, of a longitudinally-movable shaft on which the same are mounted, means for locking said wheels to the shaft when the latter is moved longitudinally, a pinion on the end of said shaft, a recess in the face of said pinion, a fixed tooth engaging said recess to force the pinion and shaft longitudinally when the pinion is rotated, and a spring bearing against the end of the shaft to hold said pinion against the tooth, substantially as described.

25. The combination with the dial-wheels, of a handle for returning the same to zero, said handle comprising a hollow shaft, spring-pressed in one direction, a locking-lug on said shaft coöperating with a recess, a pinion mounted on the shaft which is telescoped in said hollow shaft, a pinion on the dial-wheel shaft which meshes with said first-named pinion, and means for moving the dial-wheel shaft longitudinally to lock the dial-wheels thereto, when said pinion is rotated, substantially as described.

26. The combination with a trip-register, of a totalizer comprising two banks, one bank registering one class of fares, and the other bank registering all classes of fares, means for actuating said banks, and means for forcing said banks against a strip of paper for obtaining an impression from the totalizer-wheels, substantially as described.

27. The combination with a trip-register, of a totalizer comprising printing-wheels which totalizer actuates said trip-register every time a fare is registered, a pivoted frame in which said totalizer is mounted, and means for rocking said frame to disengage the same from the trip-register, and, at the same time, making a printing impression with the totalizer, substantially as described.

28. The combination with a swinging frame, of totalizer-wheels carrying printing characters on their peripheries, said wheels being mounted in said frame, a trip-register which is normally in mesh with said totalizer, a paper-feeding device feeding a strip of paper over the printing-wheels, and means for disengaging the totalizer from the trip-register, said means actuating the paper-feed mechanism, and, also, making a printing impression, substantially as described.

29. The combination with printing-wheels, mounted in a pivoted frame, of an arm extending from said frame, a roller on said arm, and a cam for engaging said roller, and actuating said printing-frame to make an impression through the medium of said arm, substantially as described.

30. The combination with a totalizer whose wheels carry printing characters on their peripheries, of a trip-register normally in engagement with said totalizer, means for disengaging said totalizer from the trip-register and making a printing impression, and means which are operative when the trip-register is actuated to prevent the reëngagement with the totalizer until said register is returned to a zero position, substantially as described.

31. The combination with a totalizer, of a trip-register which is normally in engagement therewith, a device operated by said trip-register which sets up a stop whenever the trip-register is actuated, and means for disengaging the totalizer from the trip-register, said means, also, taking an impression of the condition of said totalizer, which means are operative until arrested by the stop set up by the trip-register, substantially as described.

32. The combination with the units and tens wheels, of a trip-register, of notched disks carried by said wheels, a slide-bar provided with rollers coöperating with said notched disks, and a stop which is set up when the rollers are out of any of the notches in said disks, substantially as described.

33. The combination with a totalizer whose wheels carry printing characters on their peripheries, a pivoted frame in which said totalizer is mounted, a trip-register which is normally in engagement with said totalizer, means for rocking said totalizer-frame to make an impression, said means continuing to be operative until arrested by a stop which is set up when the dial-wheels of the trip-register are actuated, and mechanism for returning the dial-wheels to zero position and withdrawing said stop, the means for making an impression from the totalizer then being operative to make another impression and return the parts to their normal position, substantially as described.

34. The combination with a trip-register, of a printing-totalizer, and means for disengaging the printing-totalizer from the trip-register and making an impression, said means, also, operating devices which set up stops which lock the machine and prevent the registration of additional fares, substantially as described.

35. The combination with a trip-register, of a printing-totalizer, and a cam for disengaging the totalizer from the register and making an impression from said totalizer said cam, also, operating devices which unlock the register to permit its return to zero, substantially as described.

36. The combination with a trip-register, of a printing-totalizer, a cam for disengaging the totalizer from the register and making an impression from said totalizer, said cam, in its initial movement, unlocking the register so that the same may be returned to its zero position, and devices which are set up by said register to lock said cam against a complete movement, whereby said cam is arrested until the register is returned to its zero position, after which the cam, in its continued movement, causes the totalizer to make another impression, and finally restores the totalizer back into engagement with the register, substantially as described.

37. The combination with a register, of a printing-totalizer, a cam for disengaging the totalizer from the register and making an impression, said cam, also, unlocking the register so that the same may be returned to zero, a stop which is set up by the register to arrest the cam after such initial movement, which stop is inoperative when the register is in its zero position, the continued movement of the cam making another impression from the totalizer, said cam, when restored to its normal position, engaging the totalizer with the register and locking the register, an operating-handle, and means for rendering said operating-handle inoperative during the time that the cam is in a position other than normal, and means operated by said operating-handle for preventing the movement of the cam when the operating-handle is in a position other than normal, substantially as described.

38. The combination with an operating-handle, of a totalizer carrying printing characters, said totalizer being mounted in a pivoted frame, of a cam for operating said totalizer to make an impression, means operated by the totalizer-frame for rendering the handle inoperative while the totalizer-frame is out of its normal position, and means operated by the operating-handle for preventing the movement of said cam when said handle is out of its normal position, substantially as described.

39. The combination with the dial-wheels, of gears carried thereby, pinions normally coöperating with said gears for actuating the next dial-wheel in advance, pins on said pinions, means coöperating with said pins for holding the pinions in a stationary position when said pinions are disengaged from the dial-gears, and mechanism for disengaging the pinions from said dial-gears to permit the dial-wheels to be returned to zero, after which said mechanism restores the pinions into engagement with the dial-gears, substantially as described.

40. The combination with a trip-indicator, of a spring-pressed lever upon which the same is arranged, a spur-gear with which said lever coöperates, said spur-gear being formed with a recess and a projection at diametrically opposite points, and means for rotating said spur-gear a portion of a revolution every time the fare-register is reset, whereby said lever is disengaged from the recess or projection, and rests against the side face of the spur-gear, the completion of the resetting operation causing the projection or recess to register with the lever and change the direction of the trip, substantially as described.

41. The combination with the cam 133, formed with a flat face, of a two-part bell-crank lever, which is adapted to engage the flat face of the cam, to prevent its rotation whenever the operating-handle is out of its normal position, a spring between the two parts of said bell-crank lever, for normally holding the members thereof in a fixed relation to each other, but which spring will yield to permit independent movement of said members, an operating-handle, and means on said operating-handle for forcing one member of said bell-crank lever forwardly, whenever the operating-handle is moved in either direction out of its normal position; substantially as described.

42. The combination with a cam 133 formed with a flat face, of a two-part bell-crank lever which is adapted to engage the flat face of the cam whenever the operating-handle is out of its normal position, a spring between the two parts of said bell-crank lever, and an operating-handle carrying a notched concentric flange for coöperating with one of the members of said bell-crank lever, substantially as described.

43. The combination with a fare-register containing a company strip and a removable conductor's strip, the latter being accessible from the exterior of the machine, of means for impressing said strips to indicate the condition of the register at the end of each trip, and mechanism coöperating with said removable conductor's strip for rendering the register inoperative in the absence of said removable strip; substantially as described.

44. The combination with a fare-register provided with guide-pockets in its casing, said pockets receiving the company's record-strip, and a removable conductor's strip, of mechanism for impressing the condition of the register on said strips at the end of each trip, and a panel in the side of the register-casing for giving access to the company's strip; substantially as described.

45. The combination with a register and its casing, of pockets encircling the same, said pockets receiving strips of paper, mechanism for impressing the condition of the register into said strips at the end of each half-trip, one of said strips of paper being a record-strip and contained wholly within the machine, the other of said strips being accessible from the exterior, and mechanism for rendering the register operative only when the removable strip is in position, substantially as described.

46. In a fare-register, the combination with a casing formed with pockets in its side walls, one of said pockets containing a record-strip, and the other of said pockets containing a removable conductor's strip, of a totalizer carrying printing characters for making an impression on both of said strips at one stroke, and means for moving said totalizer into and out of its printing position; substantially as described.

47. In a fare-register, the combination with a casing formed with pockets in its side walls, said pockets containing parallel strips of paper, of means for feeding said strips in unison, and mechanism for impressing characters upon said strips at a single printing impression; substantially as described.

48. In a fare-register, the combination with a casing formed with pockets in its side walls, said pockets containing parallel strips of paper, a toothed wheel for piercing said strips to positively feed the same in unison, a yielding roller for forcing said strips against said toothed wheel, and means for rotating said toothed wheel; substantially as described.

49. In a fare-register, the combination with a casing formed with pockets, which pockets contain parallel strips of paper, of a panel which forms part of said casing and affords access to one of said strips, the other of said strips being threaded through the panel, and being exposed to the exterior, whereby it may be removed without opening said panel; substantially as described.

50. In a fare-register, the combination with the casing formed with pockets, which pockets contain a permanent record-strip, and a removable conductor's strip, a hinged panel forming a guide for said strips and which, in its open position, gives access to the record-strip, the removable conductor's strip being threaded through said panel, and a spring-pressed frame hinged in said panel and bearing against said removable strip; substantially as described.

51. In a fare-register, the combination with the casing and suitable guides arranged therein, which guides contain record-strips, one of which strips is removable from the exterior at all times, a rocking printing-frame for impressing said strips, a lever for engaging the removable record-strip, a coöperating device between said lever and printing-frame for locking said lever in a closed position when the printing-frame is in its normal position; substantially as described.

52. In a fare-register, the combination with a rocking printing-frame, a lever 122, carrying a projection 123, a shoulder on said lever, and a projection on the printing-frame which engages said shoulder and locks said lever in a closed position when the printing-frame is in a normal position; substantially as described.

53. In a fare-register containing a record-strip, the combination with a rocking printing-frame, carrying printing devices, of an operating-handle, means for locking said handle against movement when said printing-frame is in a normal position, and mechanism controlled by said record-strip for releasing the handle and permitting its operation when said strip is in position in the register; substantially as described.

54. In a fare-register containing a record-strip, the combination with a lever which is engaged by said strip when said strip is in position in the register, of an operating-handle, and mechanism coöperating with said operating-handle to lock the same in position when said lever is out of engagement with the record-strip; substantially as described.

55. In a fare-register containing a record-strip, the combination with a lever 202, carrying a roller 201, which is engaged by the record-strip, a spring under said lever, a spring-pressed rocking frame 196, which is engaged by said lever, a casting 197, which is conjoined to the frame 196, a rock-arm, an operating-handle connected to said rock-arm, and a projection on said rock-arm which is in the path of said frame 197; substantially as described.

56. In a fare-register, the combination with a rocking printing-frame, of a sweep-arm movable therewith, a spring-pressed frame arranged in the path of said sweep-arm, a rocking frame 197 which is depressed when said sweep engages said spring-pressed frame, and a rock-arm having a projection in the path of said rocking frame, substantially as described.

57. The combination with a rock-arm, of a bell-crank lever operated thereby, and a cam which is locked in position by said bell-crank lever whenever said rock-arm is out of its normal position, substantially as described.

58. The combination with a rock-arm, of a two-part bell-crank lever operated thereby when said rock-arm is moved in either direction, a spring for normally holding said parts of the bell-crank lever in a given relation with each other, and a cam which is engaged by one of the members of said bell-crank lever whenever the rock-arm is actuated, substantially as described.

59. The combination with a rock-arm provided with a notched flange 211, a lever 212 engaging said flange, said lever having a cam-face on its end, a lever 213 which engages the flat face of the cam, a spring 214 whose tendency is to maintain a certain relation between arms 212 and 213, and a cam which is locked in position whenever said rock-arm is moved in either direction, substantially as described.

60. The combination with a rocking printing-frame, of a cam for rocking said frame, an operating-handle, a lug for said cam which is operative whenever said rock-arm is out of its normal position, said lug yielding to permit movement of the rock-arm whenever the cam is in such position as to not properly receive the lug, substantially as described.

61. The combination with a rock-arm carrying a projection 51, of a fare-indicator, which is moved by said projection, said fare-indicator comprising an oscillating shaft, two arms conjoined to said shaft, one of which is in the path of the projection on said rock-arm, and means for holding said oscillating shaft in a fixed position after actuation by the rock-arm; substantially as described.

62. The combination with a rock-arm provided with a lug or projection 51, of an oscillating shaft carrying a fare-indicator, arms 52 and 53 fixed to said shaft, one of which is engaged by the projection 51 to oscillate the shaft, a triangular-shaped tooth carried by said shaft, a triangular-shaped tooth which is yieldingly pressed against the shaft-tooth to hold the shaft in its fixed position and carry it beyond the limit of thrust of the projection 51, and an operating-handle connected to said rock-arm for actuating the same, and its carried projection 51; substantially as described.

63. The combination with a rock-arm carrying a projection 51, of arms 52 and 53 fixed to a shaft, a stop for limiting the movement of said arms, a triangular tooth 58 carried by said shaft, and a triangular tooth 59 which engages said tooth 58, substantially as described.

64. The combination with a rock-arm, of a fare-indicator, arms connected to said fare-indicator in the path of said rock-arm, said rock-arm in its movement in either direction engaging one of said arms and initially moving the fare-indicator positively, and means coöperating with said fare-indicator to complete the stroke started by the rock-arm, substantially as described.

65. The combination with a rock-arm, of a fare-indicator which is positively moved in one or the other direction when said rock-arm is actuated, and means for operating the fare-indicator to complete its stroke when initially moved in one or the other direction by said rock-arm, substantially as described.

66. The combination with dial-wheels having spur-gears on one side and spur-segments on their opposite sides, of mutilated pinions coöperating therewith, a notched disk, and levers coöperating with said notched disk to throw said pinions into and out of engagement with the dial-wheels, substantially as described.

67. The combination with dial-wheels and the transferring-pinions, of a pivoted frame in which said transferring-pinions are mounted, a notched disk 163, and levers coöperating with said notched disk to rock said pivoted frame for throwing said pinions into and out of engagement with the dial-wheels, substantially as described.

68. The combination with a printing-frame, of dial-wheels, transferring devices coöperating with said dial-wheels, and mechanism for locking said transferring devices in position relative to said dial-wheels when said printing-frame is in its normal position, substantially as described.

69. The combination with a rocking printing-frame, of a trip-indicator comprising dial-wheels and transferring mechanism, a notched disk which coöperates with said transferring mechanism, and means for rendering said notched disk operative so that, when the printing-frame is rocked, said disk will disengage the transferring mechanism from the dial-wheels, substantially as described.

70. The combination with a rocking printing-frame, of a sweep-arm extending therefrom, a cam coöperating with said sweep-arm to rock said frame, a trip-indicator comprising dial-wheels and transferring mechanism, a notched disk which is operated in connection with the return of said dial-wheels to their zero position, a lever which is operated by said cam to lock said disk in position, and a lever which is operated by said disk to disengage the transferring mechanism from the dial-wheels during the time that said dial-wheels are being returned to their zero position, substantially as described.

71. The combination with a fare-register, of pivoted jaws $a$ and $b$, base-plate $C'$ adapted to be engaged by said jaws, and a lock for spreading said jaws into engagement with said base-plate, substantially as described.

In testimony whereof I hereunto affix my signature, in the presence of two witnesses, this 9th day of February, 1898.

GUSTAVUS REIN.

Witnesses:
F. R. CORNWALL,
HUGH K. WAGNER.